United States Patent [19]

Faes

[11] Patent Number: 4,857,945
[45] Date of Patent: Aug. 15, 1989

[54] PRINTING DEVICE AND METHOD EMPLOYING LATENT ELECTROSTATIC IMAGE DEVELOPMENT AND SEPARATE TONER-BRUSH OPERATIONAL CYCLE

[75] Inventor: Steven M. Faes, Huntsville, Ala.

[73] Assignee: SCI Systems, Inc., Huntsville, Ala.

[21] Appl. No.: 193,352

[22] Filed: May 12, 1988

[51] Int. Cl.[4] .............................................. G01D 15/00
[52] U.S. Cl. ................................ 346/160.1; 346/153.1
[58] Field of Search ................. 346/153.1, 154, 160.1; 355/3 DD, 14 DD; 400/119; 364/407

[56] References Cited

U.S. PATENT DOCUMENTS 4,710,016 12/1987 Waatanabe ....................... 355/3 DD Primary Examiner—Arthur G. Evans
Attorney, Agent, or Firm—Curtis, Morris & Safford

[57] ABSTRACT

A printer and method employing latent electrostatic image development in which the toner brush and print drum operate on separate cycles. See, FIGS. 28 and 28A and the description associated with these figures under the heading, "Toner Brush Drive." Two different drive motors are used to drive the drum and the toner brush, and the toner brush is operated only during those portions of a printing cycle during which latent electrostatic image-bearing areas of the drum are moving past the toner brush. This minimizes the waste and accumulation of wasted toner materials in the printer and the frequency with which accumulations of wasted toner must be removed from the printer. The use of a separate drive motor for the toner brush has the added advantage that it eliminates oscillation and gear-lash, thereby eliminating uneven darkness in the printing.

18 Claims, 35 Drawing Sheets

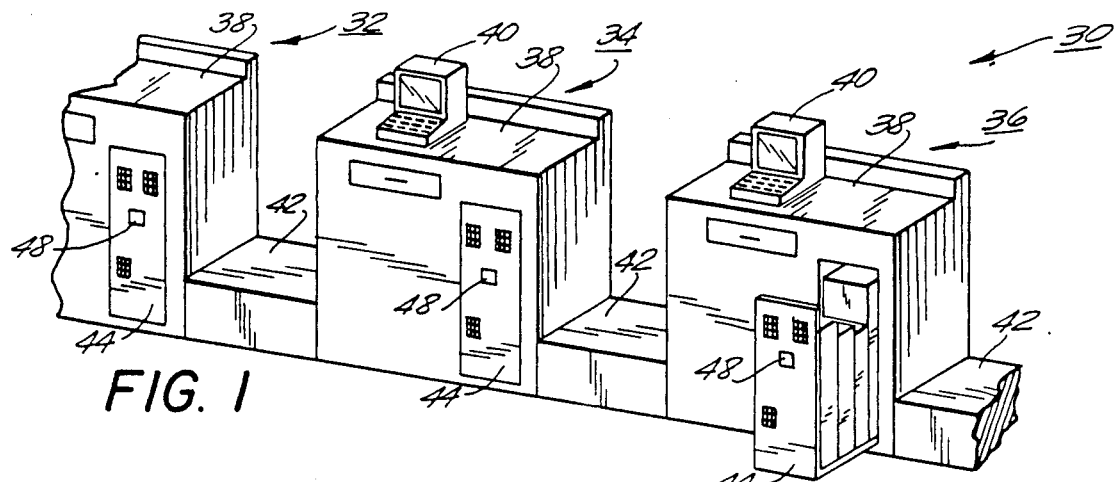

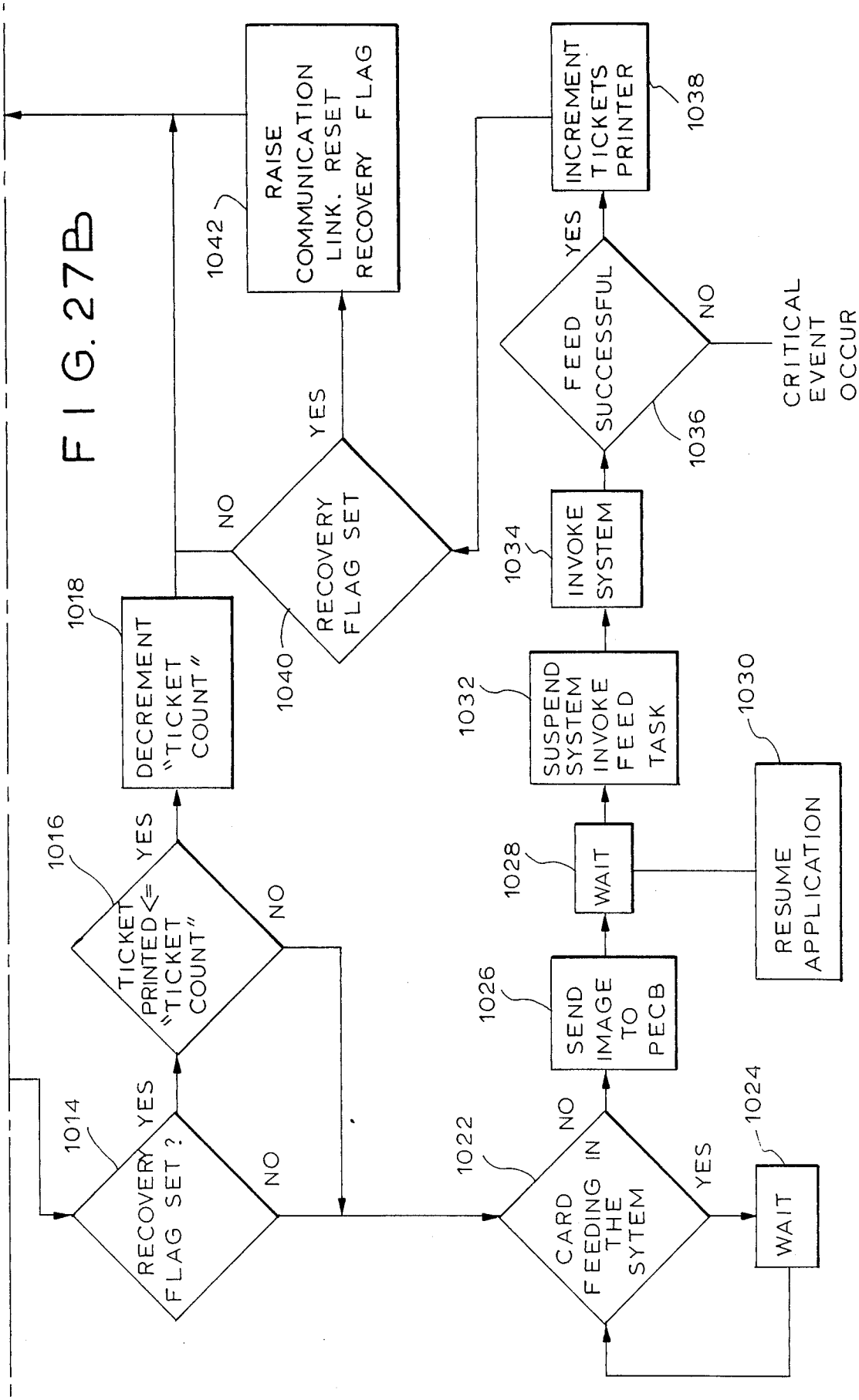

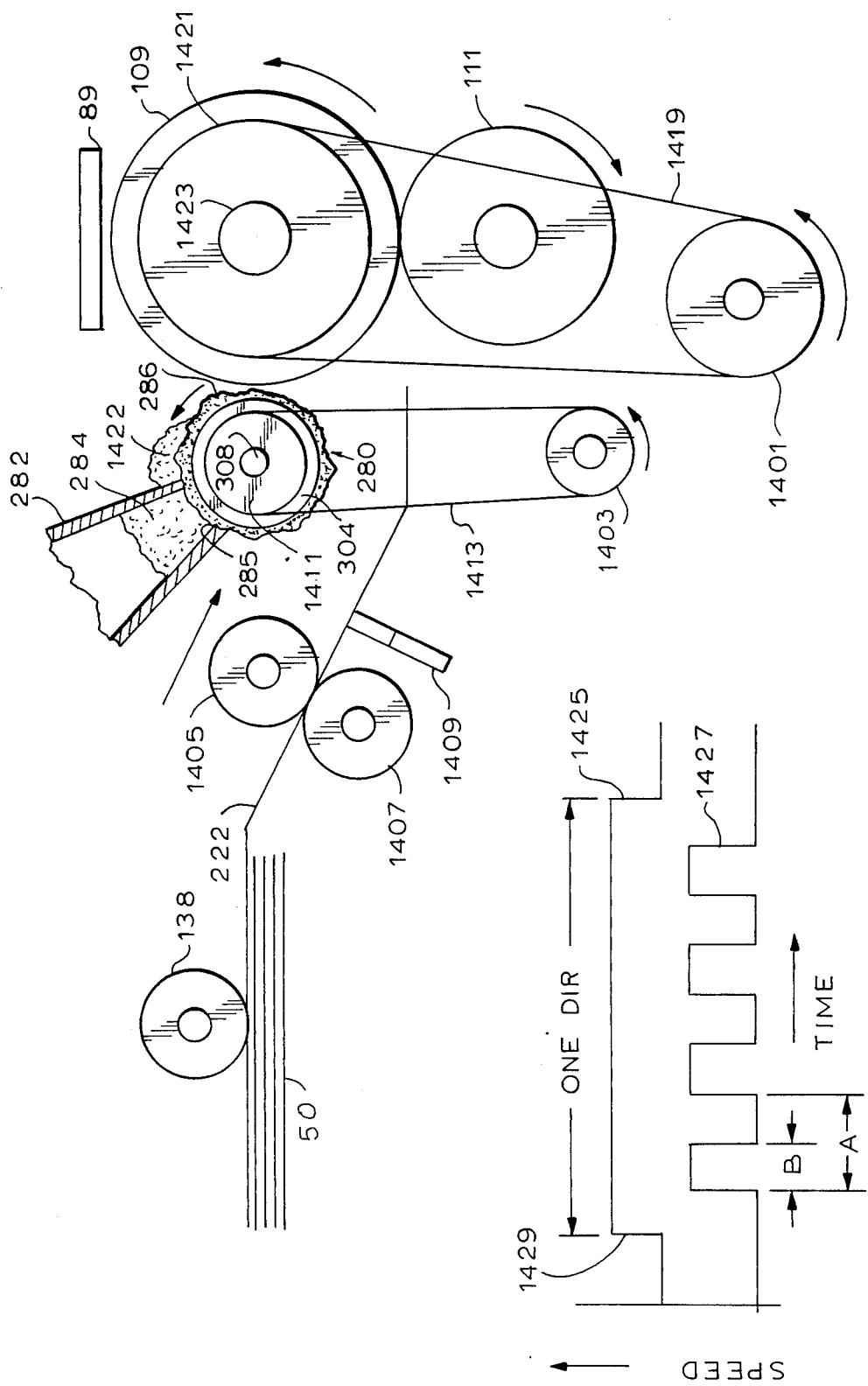

PRINTING DEVICE AND METHOD EMPLOYING LATENT ELECTROSTATIC IMAGE DEVELOPMENT AND SEPARATE TONER-BRUSH OPERATIONAL CYCLE

This invention relates to printers and printing methods, and particularly to printing apparatus and methods for printing vehicular transportation passenger coupons such as airline tickets and the like. This patent application discloses an improvement of the inventions of U.S. patent application Ser. No. 07/051,046, filed on May 15, 1987, and of U.S. patent application Ser. No. 07/183,004, filed on Apr. 18, 1988.

The printing of airline tickets and the like creates significant problems. One problem is that the printing must be done quickly, and yet the printer should be compact in order to minimize space usage at airline ticket counters. Another problem is that the printing should be of relatively good quality or resolution so as to maximize readability by the customer and the ticket sellers, and yet the printer must be cost effective. Furthermore, the printer should be reliable, especially in view of the fact that tickets sellers seldom have the time to tend to balky printers.

Particular problems are caused by the desire to print single sheet tickets and coupons in card form, with recording of information on a magnetic area or stripe on the card. Not only the printing mechanism, but also the magnetic recording and reproducing mechanism often must be fitted into a relatively small space, and alignment of the card must be accurately controlled for both magnetic recording and for printing.

A specific problem with printing transportation coupons such as airline tickets is that each one is printed with a unique serial number and must be accounted for by each clerk who has been issued a supply of the forms. Therefore, misfeeds, jams and destruction of forms can cause major problems in accounting, personnel, and customer satisfaction, and the printer should minimize those problems Various types of printers have been used in the past as transportation coupon printers. Such printers include dot matrix and thermal printers. Those printers usually are relatively slow and often do not produce printing of good quality. Moreover, they tend to use "consumables" (e.g., ribbon) at a relatively high rate and thus are costly to use.

Accordingly, it is an object of the present invention to provide a printing device and method which eliminate or alleviate the foregoing problems; specifically, it is an object to provide a printer and method which produce relatively high speed, high-quality printing, within a compact space, and at a relatively low manufacturing cost. Furthermore, it is an object to provide such a printer and method with a relatively low consumption of consumable materials.

It is a further object of the invention to provide discrete sheet handling mechanisms for printers, and particularly transportation vehicle coupon printers, in which sheets are fed from multiple stacks alternatively with a relatively simple and reliable mechanism. It is a further object to provide such a printer in which the document feeding mechanism is relatively easy to manually manipulate to free trapped documents or otherwise correct the relatively infrequent misfeeds in the system.

It is another object of the invention to provide a printer and method which is highly reliable and has a relatively small number and cost of electronic components; a printer which is relatively simple to maintain, and which permits adjustment by the operator by the use of push buttons or switches.

In accordance with the present invention, the foregoing objects are met by the provision of a printer and method, and particularly a printer and method for printing vehicular transportation coupons such as airline tickets, in which advantageous use is made of an ion deposition type of print engine. The resolution provided by the printer is relatively high (e.g., 240 dots per inch), and yet the cost is relatively low. Advantage is taken of the fact that the ion deposition type of print engine has a print head with a stationary array of holes at which ionization is created to develop latent images of dots on a dielectric drum. The print head spans the width of the document being printed. Applicants, by feeding the elongated sheets or cards longitudinally though the printer, the width of the print head required is minimized and the size and cost of the print engine is reduced.

In the sheet feeding mechanism and method of the invention, sheets are supplied in two side-by-side stacks. This arrangement saves space and improves the reliability of the feeding process. By this means, supplies of coupons or documents of different types can be stored and supplied on demand, or multiple stacks of the same documents can be provided without greatly increasing the size of the equipment or compromising the reliability of sheet feeding.

The document feeding mechanism is made extremely accessible by providing a short, direct feed path from the form storage area to the print engine, near the upper portion of the printer. Portions of the feed mechanism are mounted on hinged supports which can be easily pivoted by hand upwardly to give access to the document feed path to allow manual removal or repositioning of misfed documents.

Simple electronic means are provided for varying the blackness of the printed images. Moreover, control hardware and software are provided which minimize size and manufacturing costs and maximize the speed and reliability of operation of the printer.

The airline ticket printer receives information needed to print tickets from a central computer. The central computer arranges the data needed for printing a group of related coupons into a packet called a Document Interactive Record ("DIR") in order to avoid repetition of information common to all of the coupons in the group. This grouping saves labor and time needed to input the data, and also saves data storage space and time, and data transmission time.

For example, when ticketing a group of people to fly together to a common destination, the flight number, destination and other such information is input, stored and transmitted only once for everyone in the group, and the only other information needed is the names of the passengers and other information specific to each passenger to enable the printing of tickets for everyone in the group.

Another example is one in which a single passenger is being ticketed for a trip having multiple segments or "legs". A separate coupon (ticket) usually must be printed for each leg of the trip. In this instance, the passenger information is the same for each coupon and is not repeated, but the destination, flight number, etc. is different for each leg and is stored separately for each ticket.

The printing of coupons for each such "DIR" creates one problem that, if the printing of coupons for a "DIR" is interrupted before it is completed, such as by a jam in the coupon feeding mechanism, the data in the DIR could be lost, or the coupons already printed for the DIR must be printed again. This will create a substantial waste of time and coupons, and will be especially damaging if each coupon must be accounted for by the ticket agent, in that time will be wasted in accounting for the tickets printed twice.

It is desired to minimize the amount of memory required in the printer in order to minimize manufacturing costs. A further problem is created by relative limited memory capacity of the printer, and by the need to promptly accept and store data sent by the central computer. Data which is not accepted promptly often is lost and must be input once again. This may require that the operator type the information again.

Another problem is evaluating when the communication link between the printer and the central computer should be either enabled or disabled. When a printer interruption occurs, coupons cannot be printed. However, the host computer could continue to send information to the printer. Since memory is limited, the information cannot be continuously placed in storage. To prevent the loss of information due to limited memory, the communication link between the printer and the information source should be disabled, but without destroying the information in a DIR being transmitted.

It is a further object of the invention to provide a system and method in which the foregoing problems are eliminated or greatly alleviated. Specifically, it is an object to provide a printer which recovers from operational interruptions without having to reprint coupons in a series of related coupons, and without loss of information stored for use in printing the related coupons.

It is another object to minimize memory requirements and the cost of memory for the printer without an excessive loss of data received from the central computer.

In accordance with the present invention, the immediately preceding objectives are met by the provision of a printer with memory protection to prevent the loss of any data from a packet when operation of the printer is interrupted, together with means for determining where in the packet of data the printer stopped printing so as to avoid the need for re-printing sheets already printed. Preferably indicia are used to indicate the beginning and end of each packet and means for identifying the sub-packet of information last utilized to print a coupon.

In accordance with another feature of the invention, a ring buffer is used to store incoming data and erase the oldest data so as to allow the use of relatively limited memory capacity in storing the incoming data. Preferably, the buffer is formed from battery-backed semiconductor random access memory ("RAM").

Desirably, overflow protection for the ring buffer is provided. When the printer falls too far behind the transmission of data from the central computer, the communication link over which the data flows from the computer to the printer is disabled. However, the link is maintained until the data packet being transmitted has been transmitted completely. If the ring buffer fills before transmission of the last packet is complete, then the overflow is directed to an auxiliary memory location. Transmission of data is not resumed until space in the ring buffer again becomes available.

The print engine produces a latent electrostatic image on the dielectric surface of a rotary print drum. This image is developed by the application of toner from a rotary magnetic toner brush which is adjacent to the print drum. The documents are printed with this image by passing them between the print drum and a pressure roller which fuses the toner into the documents.

A problem is created if toner is not transferred to the print drum evenly. An uneven transfer causes the images printed on the documents to exhibit "toner deprivation," i.e., alternating light and dark areas of printing.

Further problems are caused by the unwanted accumulation of excess toner near the toner brush. This accumulation can cause deterioration of the printing quality. Also, substantial operating costs may be incurred in removing the accumulation, as well as in wasted toner.

Accordingly, it is a further object of the present invention to provide a printing device and method which eliminate or alleviate the foregoing problems. Specifically, it is an object of the invention to provide a printer and method which produce printed images which are relatively even in contrast and darkness. It is a further object of the invention to avoid or minimize the accumulation of excess toner and minimize the wasting of toner material. It is an object to reduce the "background" in the printed copies and thus improve their quality. Furthermore, it is an object of this invention to provide such a printer at a relatively low manufacturing cost.

In accordance with the present invention, the immediately foregoing objects are met by the provision of a printer and method in which the means that drive the toner brush are disassociated from those that drive the print drum. Preferably, two different drive motors are used to drive the drum and the toner brush. It has been found that this produces a marked improvement over the usual drive arrangement in which a single drive motor drives the drum, and the toner brush is driven through a gear train coupled to the drum. The use of a separate drive motor for the toner brush eliminates oscillation and gear-lash that are believed to have been the main causes of prior toner deprivation and uneven darkness in the printing.

Another benefit from the independent drive arrangement is that it permits the toner brush to be stopped and started independently of the drum.

Another feature of the invention is that preferably the toner brush is rotated only during those portions of a printing cycle in which latent electrostatic image-bearing areas of the drum are passing by, and remains stationary at other times.

It has been found that this minimizes the accumulation of wasted toner materials and thus minimizes the frequency with which the accumulations must be removed, as well as reducing waste of the toner material. This improvement has the added benefit of reducing the transfer of toner to areas of the drum where it is unwanted, and thus, significantly improves the quality of the printing.

Preferably, the latter feature is combined with the slight rotation of the magnetic "lobes" of the brush to move them away from the drum surface areas between latent image-bearing areas so as to further minimize unwanted toner transfer.

It is not intended that the invention be summarized here in its entirety. Rather, further features, aspects and advantages of the invention will be set forth in or apparent from the following description and drawings. In the drawings:

FIG. 1 is a perspective view of a portion of an airline ticket counter at an air terminal, showing several individual stations, each of which has one of the printers of the invention;

FIG. 2 shows an airline flight coupon printed by use of the printer and method of the present invention;

FIG. 3 shows a reservation confirmation coupon printed by use of the printer and method of the present invention;

Figure 12:
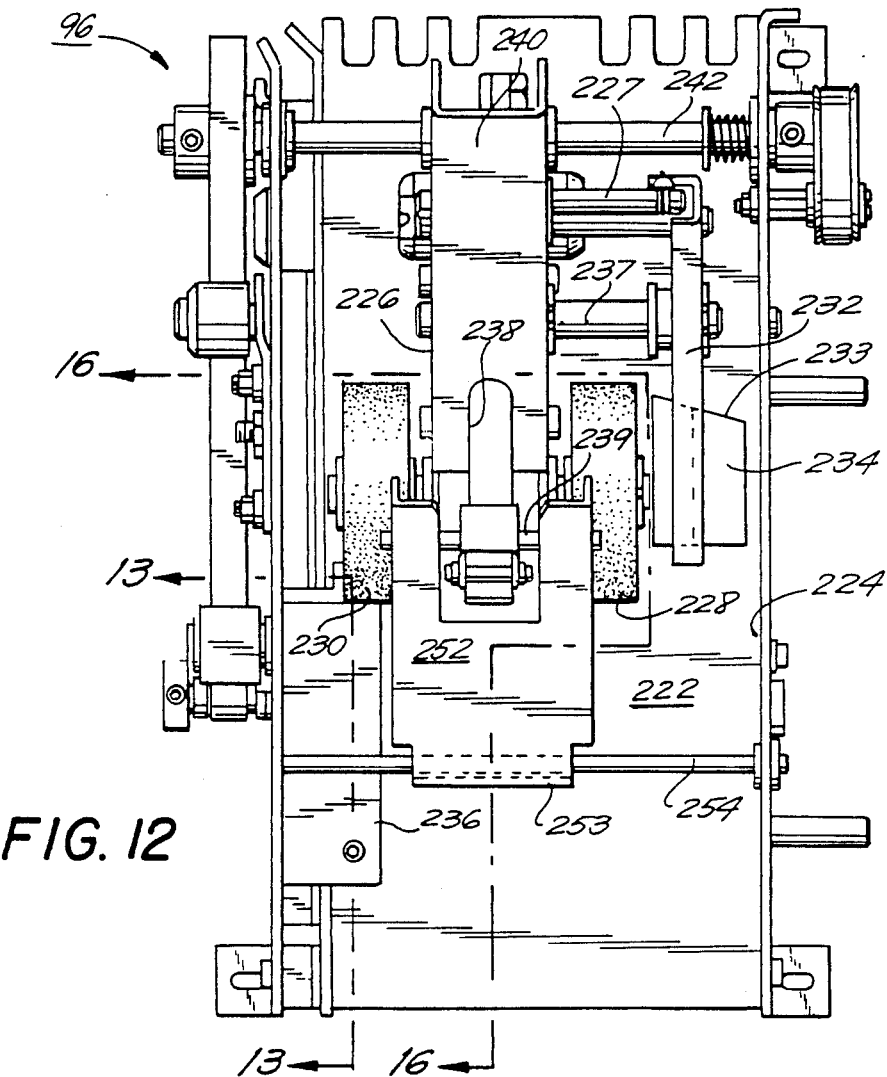
FIG. 12 is a top plan view of the mechanism shown in FIG. 11.
Figure 13A:
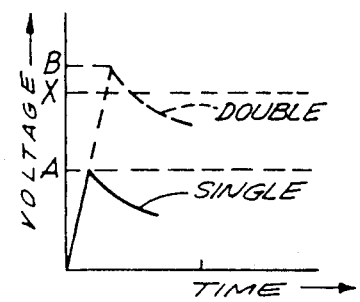
FIG. 13 is a cross-sectional view taken along line 13—13 of FIG. 12.
Figure 13:
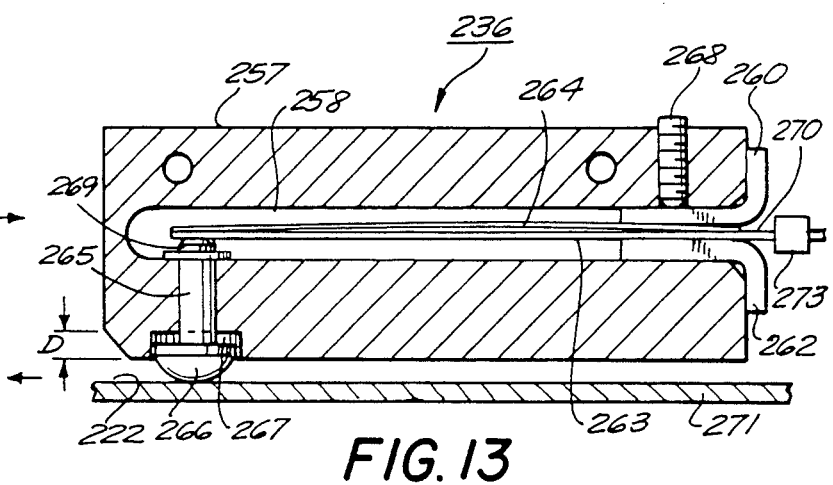
Figure 14:
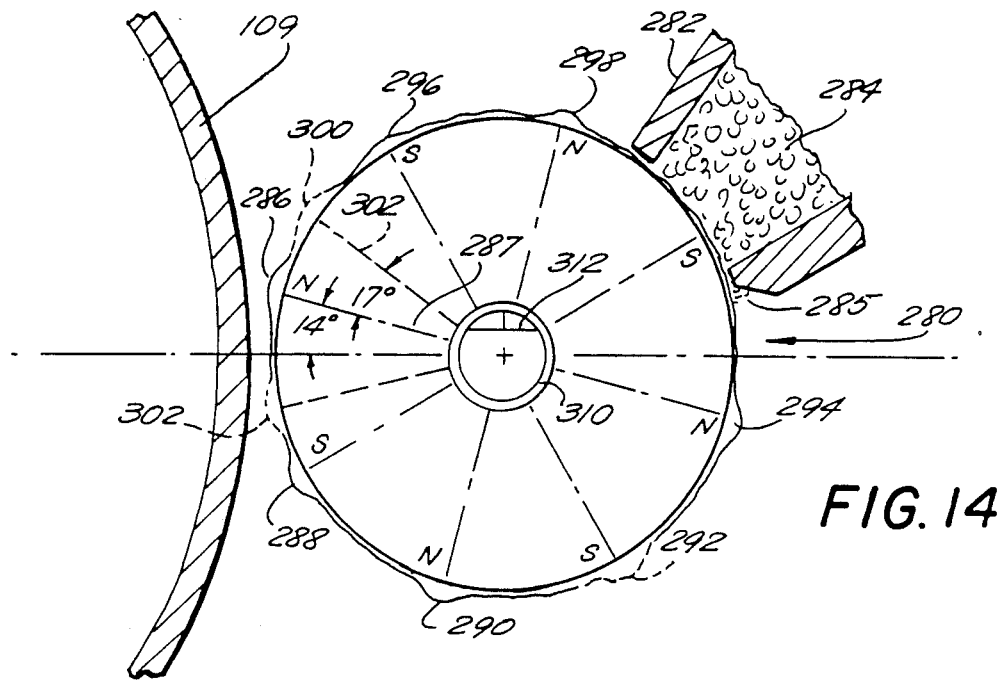
Figure 15:
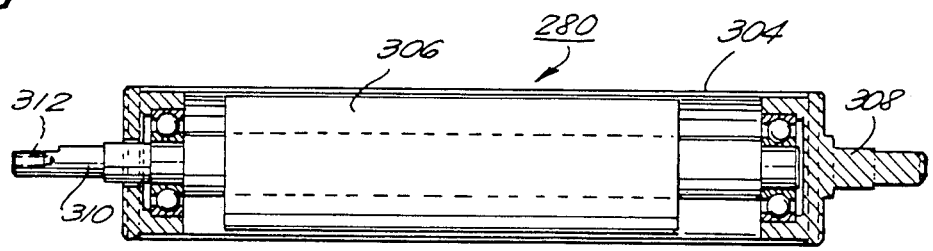
Figures 16, 17:
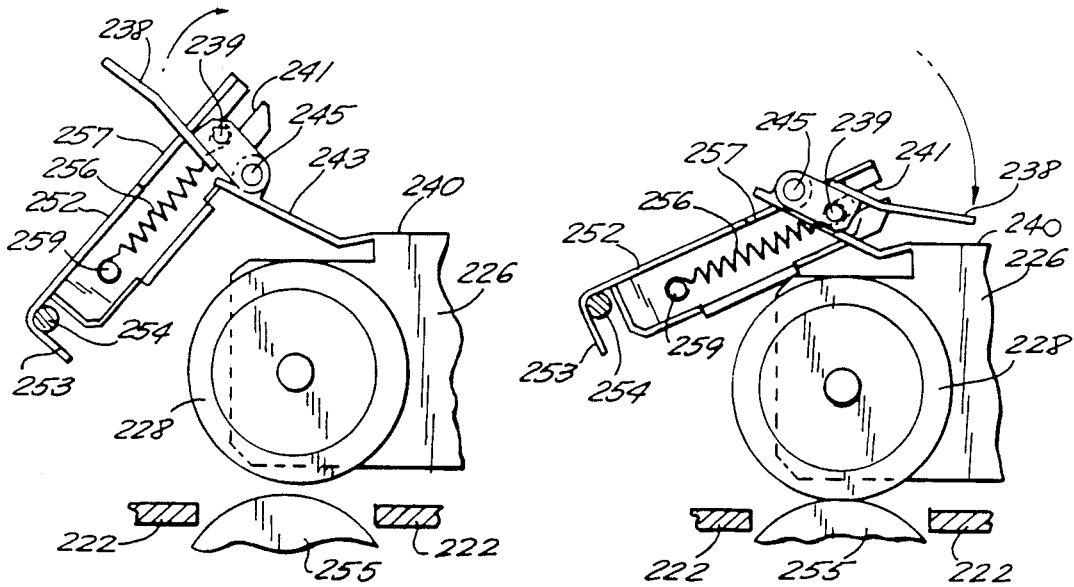
Figure 18:
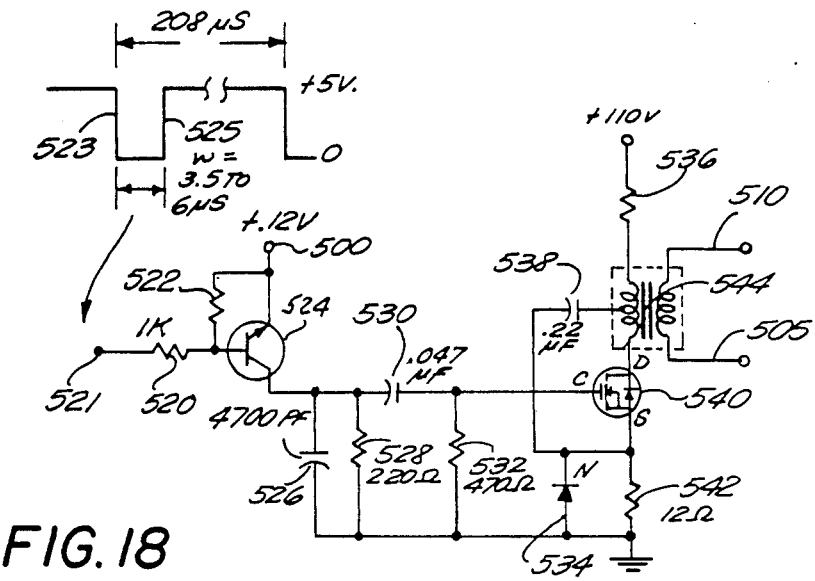
Figure 19:
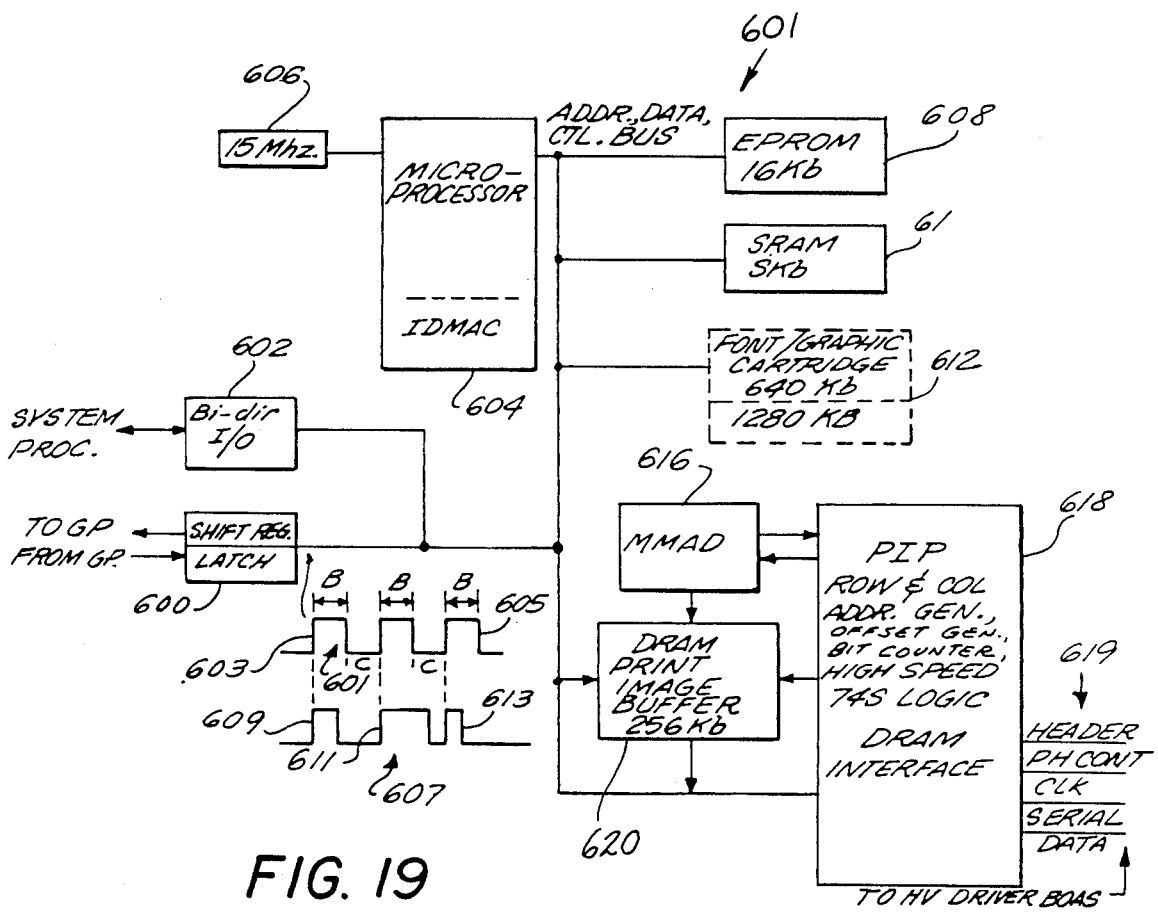
Figure 20A:
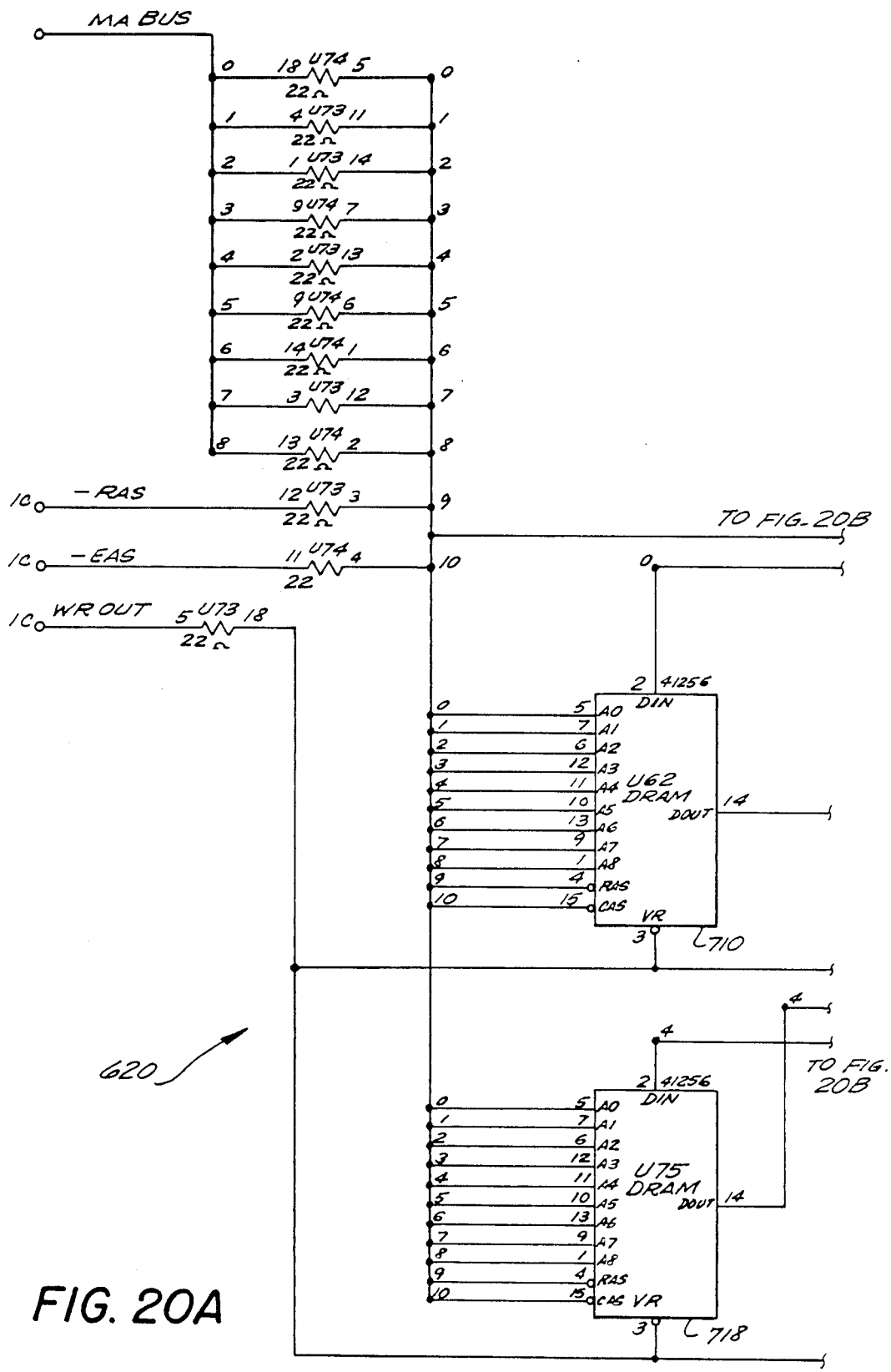
Figure 20B:
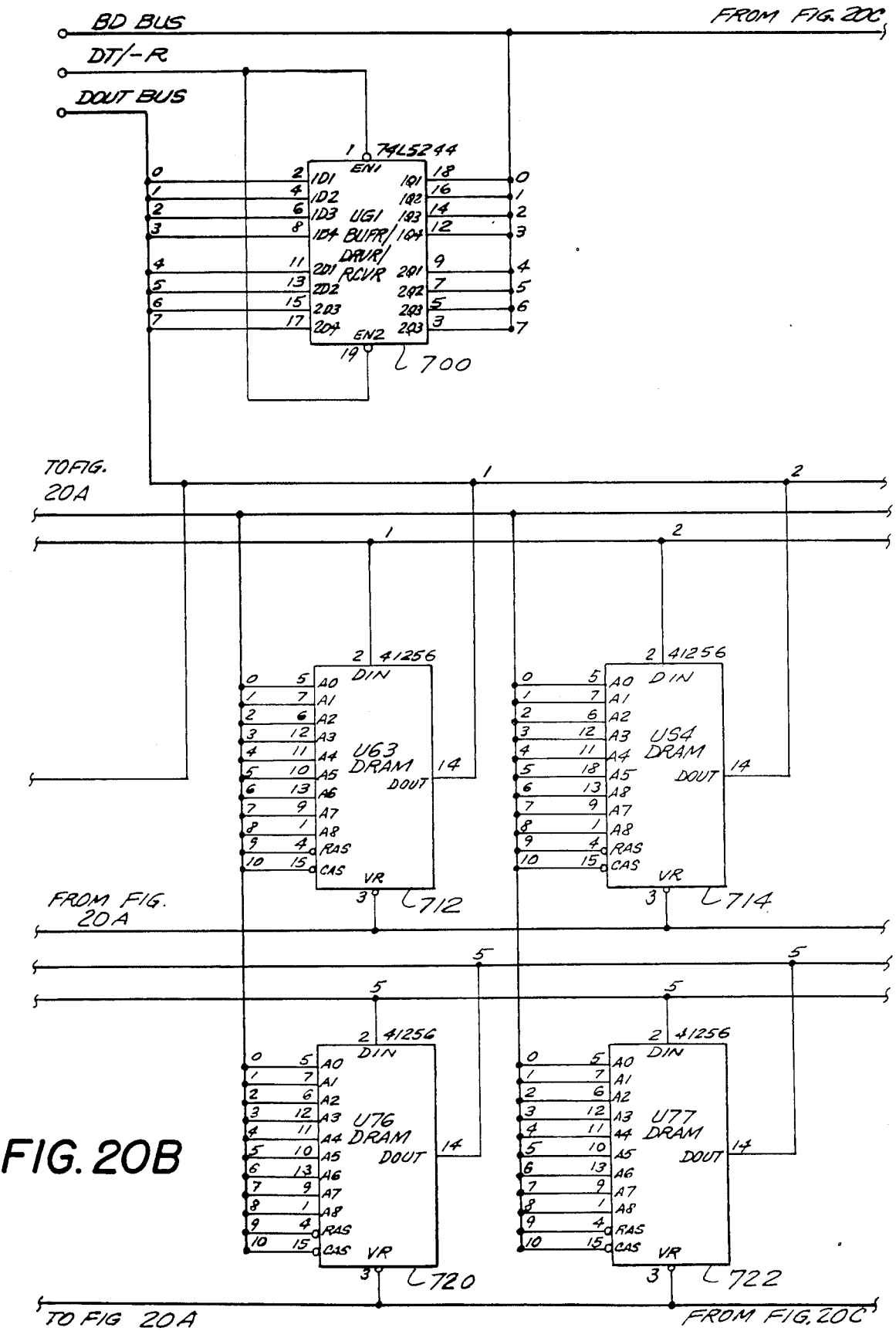
Figure 20C:
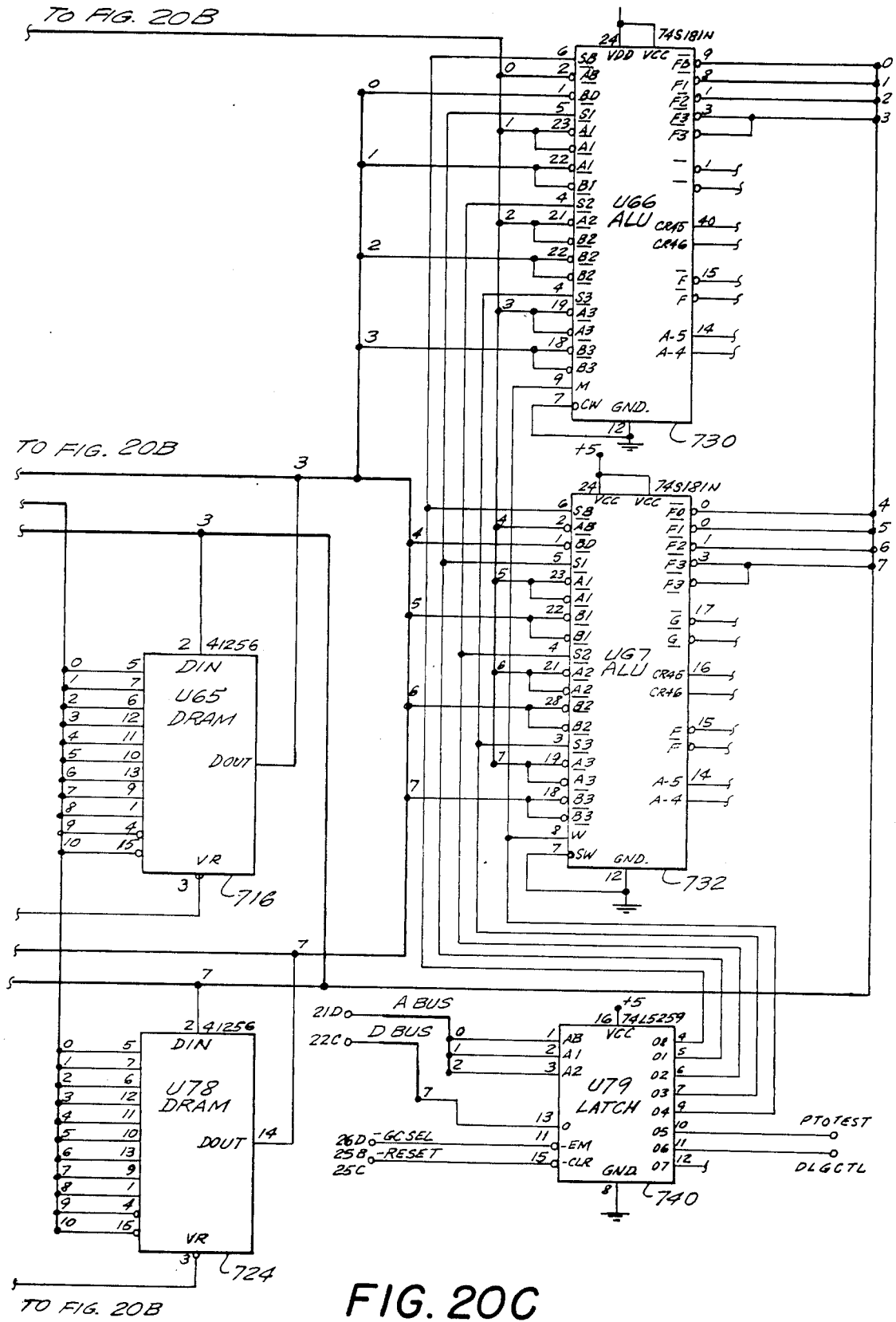
Figure 23:
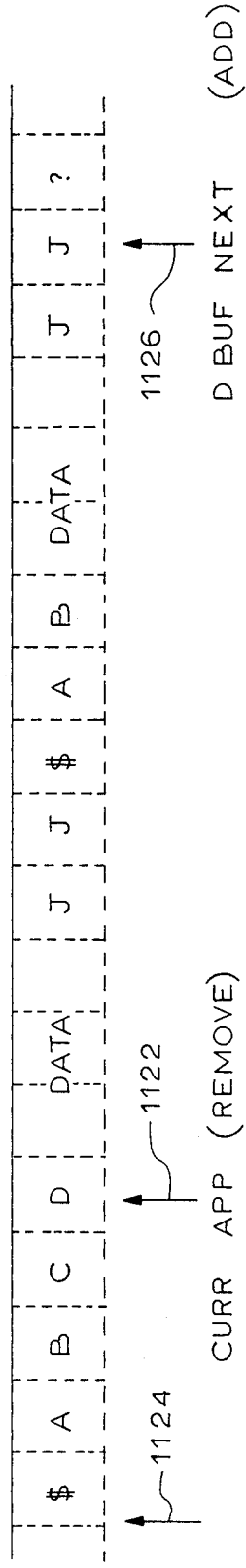
Figure 21:
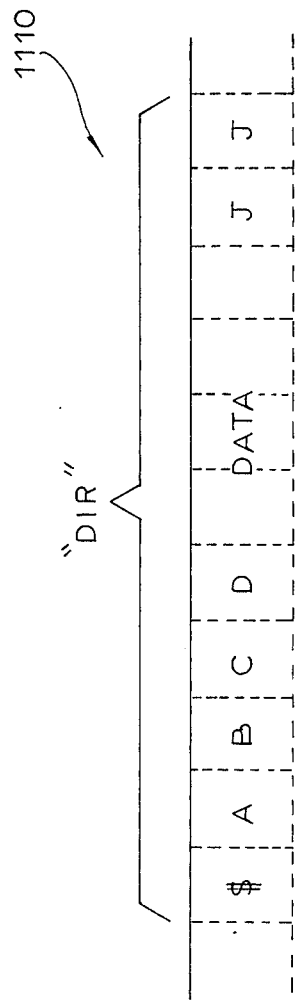
Figure 22:
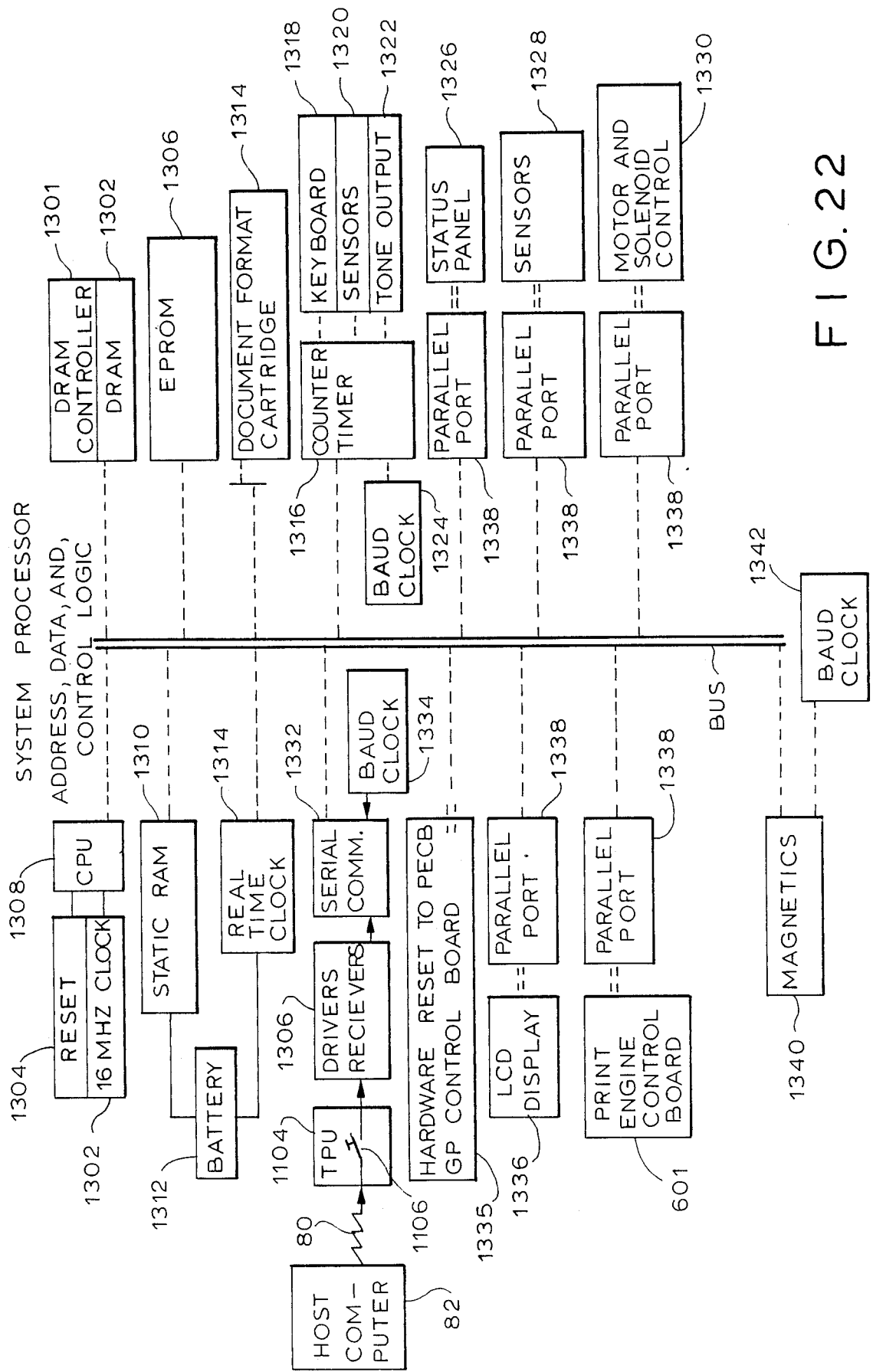
Figure 24A:
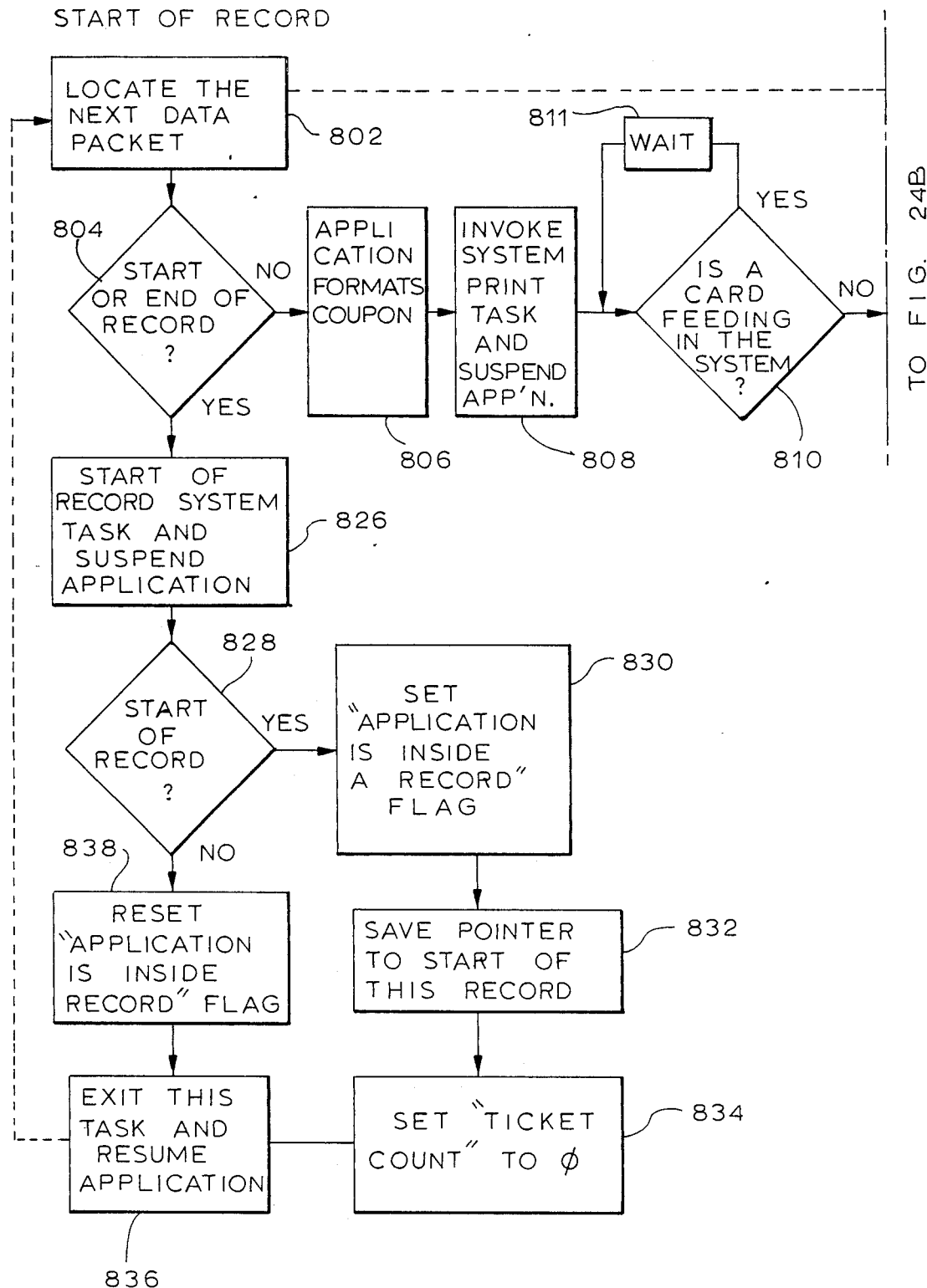
Figure 24B:
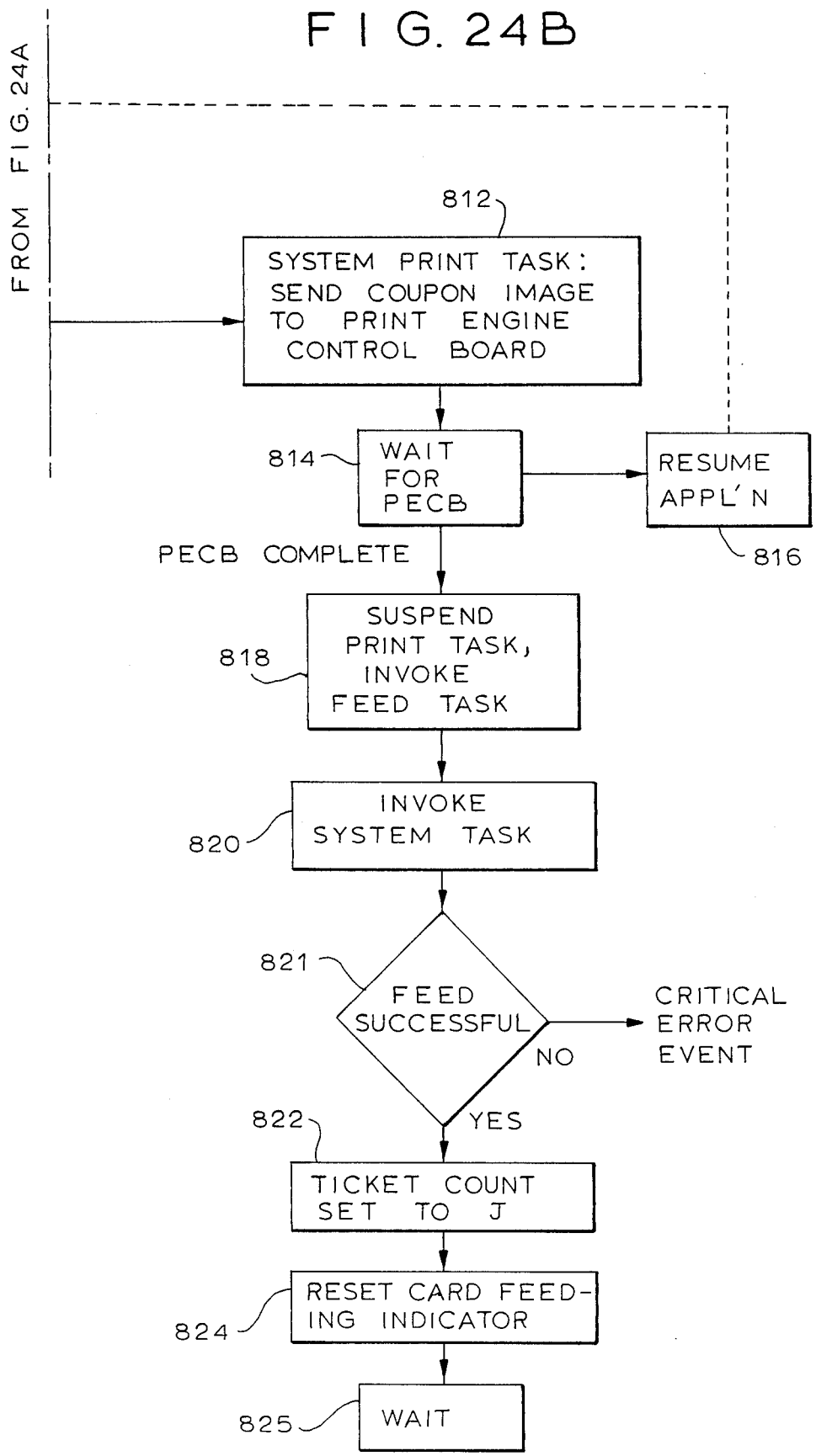

FIG. 13A a waveform diagram illustrating the operation of the device shown in FIG. 13;

FIG. 14 is an elevation view, partially cross-sectional and partially schematic, illustrating the toner applicator disabling feature of the present invention;

FIG. 15 is a cross-sectional view of the toner applicator roller shown in FIG. 14;

FIG. 16 is a cross-sectional view taken along line 16—16 of FIG. 12, with the latch mechanism in a first position;

FIG. 17, is a view like that of FIG. 16 with the latch mechanism in a second position;

FIG. 18 is a schematic circuit diagram of a electrical firing circuit used in the invention;

FIG. 19 is a block diagram of the print engine control circuit;

FIG. 20 is a block diagram of the byte mapping/bit control logic circuit of the invention;

FIG. 21 is a schematic diagram showing the basic structure of a DIR information packet;

FIG. 22 is a block diagram of the system processor which, together with the circuitry of FIG. 19, comprises the control system for the printer of the invention;

FIG. 23 is a schematic diagram of a ring buffer used to store information that is required to print multiple coupons in a DIR and;

FIGS. 24A, 24B, 25, 26, 27A and 27B are flow charts illustrating the operation of the system processor in handling the input and printing of coupons in a DIR.

FIG. 28 is an elevation view, partially cross-sectional and partially schematic, of the toner brush, dielectric drum and their driving mechanisms.

FIG. 28A is a waveform diagram illustrating the timing sequence for the motor driving the toner brush and dielectric drum.

GENERAL DESCRIPTION

FIG. 1 shows a typical airline ticket selling counter 30 with individual ticket selling stations shown at 32, 34, and 36. At each station there is a counter top 38, an input/output device 40, a relatively low baggage-receiving and weighing surface 42, and a coupon printer 44. Printed tickets or other coupons are issued through an outlet opening 48 in the front of the printer. Each input/output device has a video screen and a keyboard enabling the operator to input passenger and other information and retrieve information regarding seat availability, etc.

Figure 4:
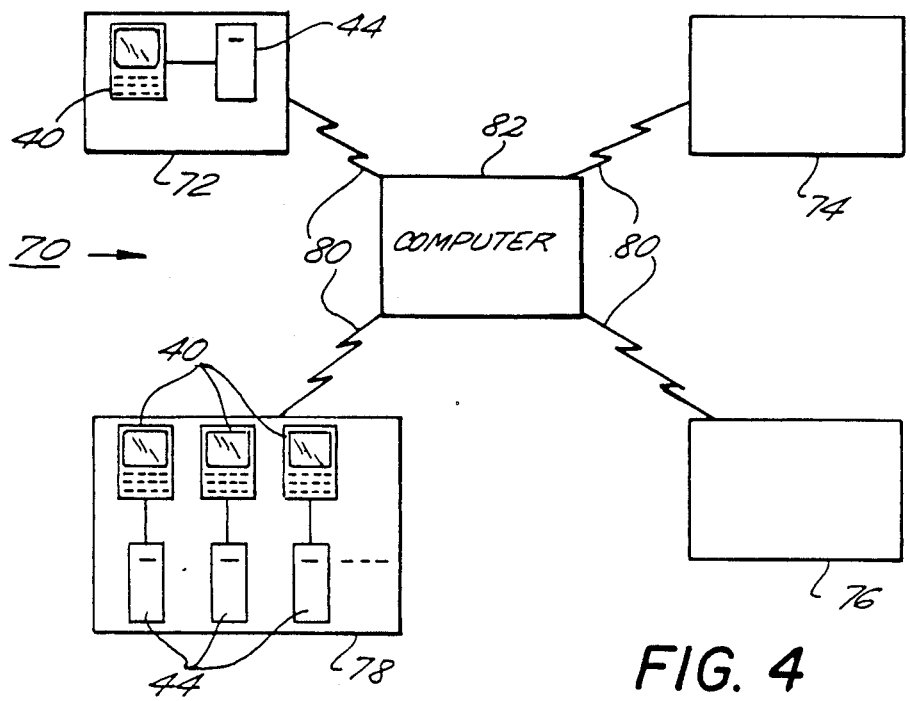
FIG. 4 is a schematic block diagram showing the computer network into which the individual sales terminals and printers are connected through a terminal processing unit in the sale of airline tickets and other coupons.

As it is shown in FIG. 4, each input/output device 40 is connected by modems and other equipment (not shown) through remote links 80 to a central computer 82 in a regional or nationwide network involving a plurality of different input/output stations at locations 72, 74, 76, 78 etc.

If desired, each location can contain as few as one input/output device 40 and one printer 44, as in the case of the location 72, which might be a travel agent's office, for example, or it can contain a large number of such combinations as in an airline terminal 78. The computer 82, an example of which is called "Apollo", computes, stores and sends reservation data and other data necessary to enable the ticket sales personnel to sell tickets, and to enable the printers to print coupons.

Referring again to FIG. 1, the printers 44 are fitted into relatively narrow and restricted cabinet spaces in the counters. The printers are mounted to slide outwardly from the cabinets so as to give the operator ready access to the printer mechanism. The printer 44 shown in the lower right hand portion of FIG. 1 has been withdrawn from its cabinet in the manner described. Preferably, a key must be inserted into a lock (not shown) on the front of the unit to release it from the cabinet so it that can be pulled out. This lock preferably disables high voltage circuitry within the printer mechanism so as to allow operators to handle it without being shocked.

FIGS. 2 and 3 show two different types of coupons which can be printed by the printer mechanism 44 for use in airline transportation transactions.

FIG. 2 shows a passenger ticket and baggage check form 50. The form 50 has a stub end portion 52 which is intended for use in stapling the forms together and thus is excluded from the area to be printed on. The portion 52 is separable from the body of the form by perforations at 54. The form also has a boarding pass portion 56 at the opposite end. The boarding pass 56 is easily separable from the remainder of the coupon by means of a perforation 58.

The stub end 52 includes a relatively large black rectangular spot 60 on an otherwise light background. The spot 60 is used in the transport of the form in the printer mechanism, as it will be described in greater detail below.

The form 50 includes spaces for printing all relevant passenger ticketing information, including the amount of the fare and the total cost. It also includes a space for printing baggage information so that the coupon can be used by the passenger to reclaim his or her baggage.

Each of the forms 50 includes a pre-printed serial number indicated at 64. The forms are numbered serially so that strict accounting can be had for all forms issued. Each ticket agent or travel agent is held strictly accountable for every form issued to him or her. For example, during the shift of a ticket agent at one of the ticket counters shown in FIG. 1, the agent will be issued a group of serially-numbered forms, and the agent must account for all of those forms at the end of his or her shift. Thus, there is a significant need for the printer to avoid losing or damaging forms in the printing process. Furthermore, if two forms are fed simultaneously or a jam occurs, the operator should correct the situation immediately, in order to avoid the loss of a form. The printer should not require the operator to destroy forms in the process.

Still referring to FIG. 2, on the rear surface of the form 50 is a magnetic stripe 62 shown in dashed lines extending the entire length of the form near its upper edge as shown in FIG. 2. Data regarding the passenger and the transaction are recorded on the magnetic stripe 62 and can be read by magnetic reading means to input the data quickly into the central computer for use in its operations, or for a variety of other purposes.

The coupon 66 shown in FIG. 3 is a reservation confirmation coupon or form for automobile rentals made by the passenger through a travel agent or airline ticket agent. The form 66 is not perforated, but has a black spot 60 on the stub end 52 in the same location and of the same size as that on the form 50 in FIG. 2.

Reservation confirmation form 66 also can be used for confirming hotel reservations or any similar matter to be handled by the ticket agent or travel agent. Both types of travel coupons 50 and 66 shown in FIGS. 2 and 3 can be stored in and printed by the printer 44 upon demand.

Figure 5B:
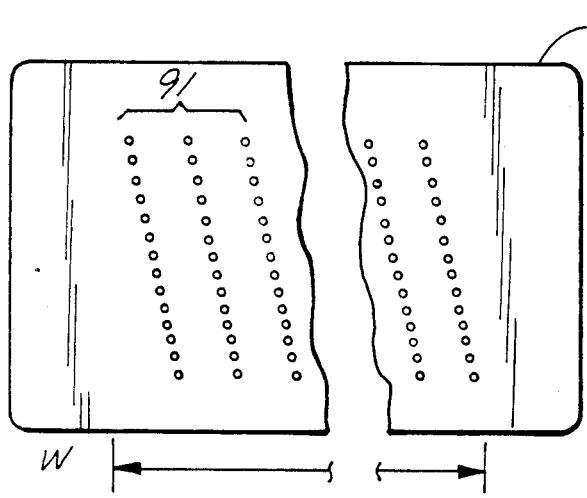
FIG. 5B is an elevation view, partially broken away, of a print head used in the ion deposition print engine.
Figure 5A:
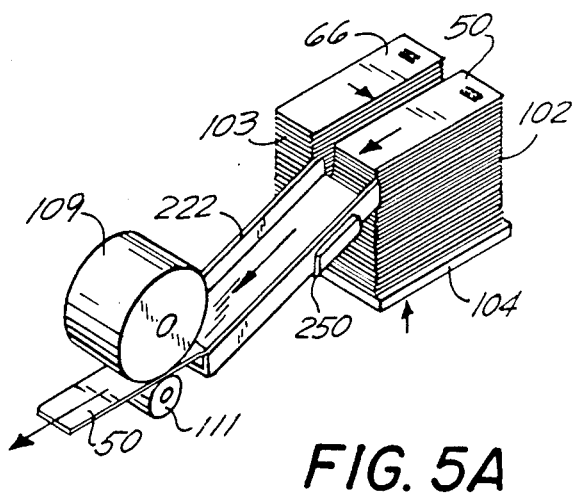
FIG. 5A is a schematic perspective view illustrating the flow path of forms through the printer of FIG. 5.
Figure 5:
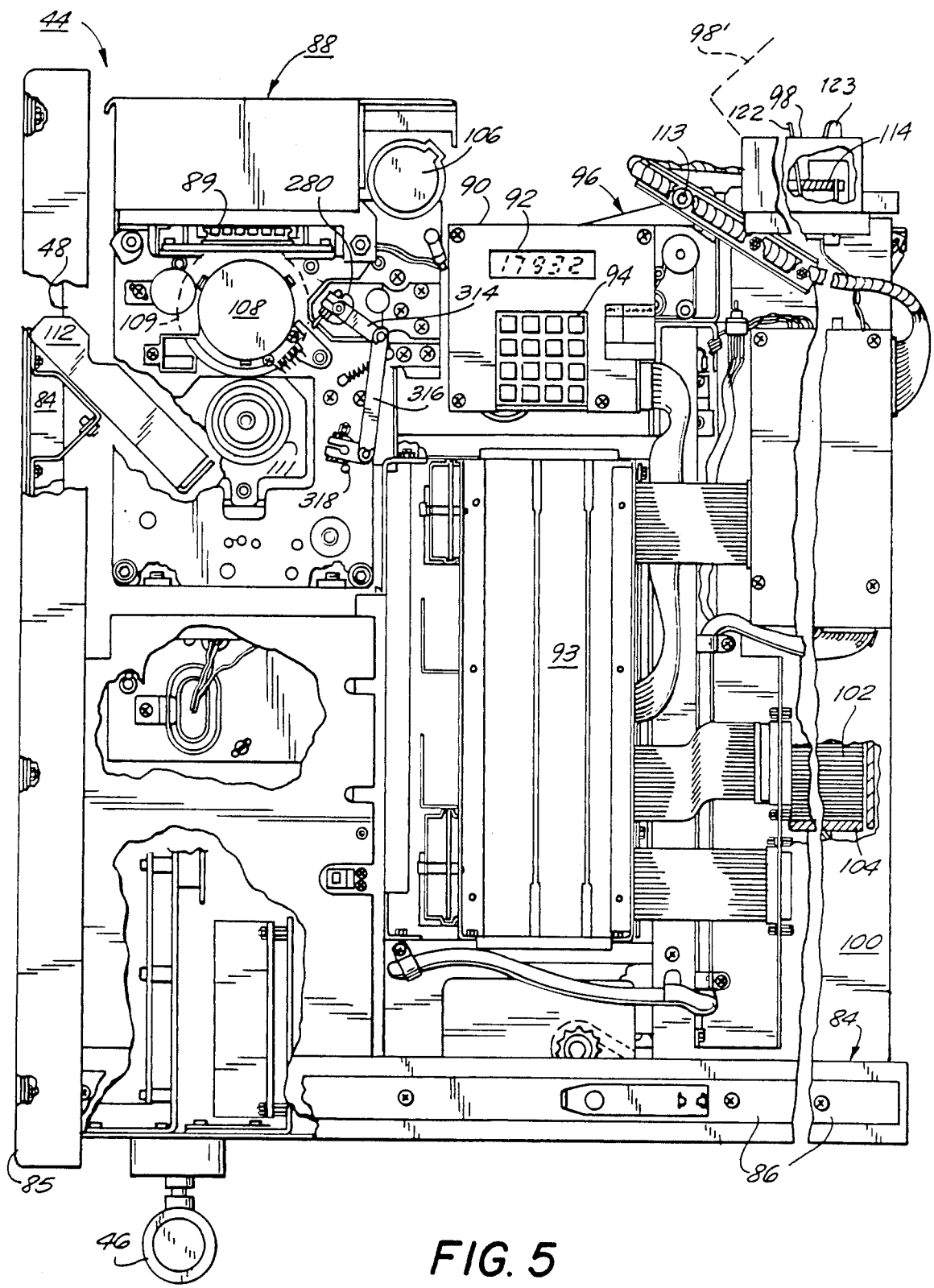
FIG. 5 is a right side elevation view, partially broken away, showing the printer mechanism of the present invention.
Figure 6:
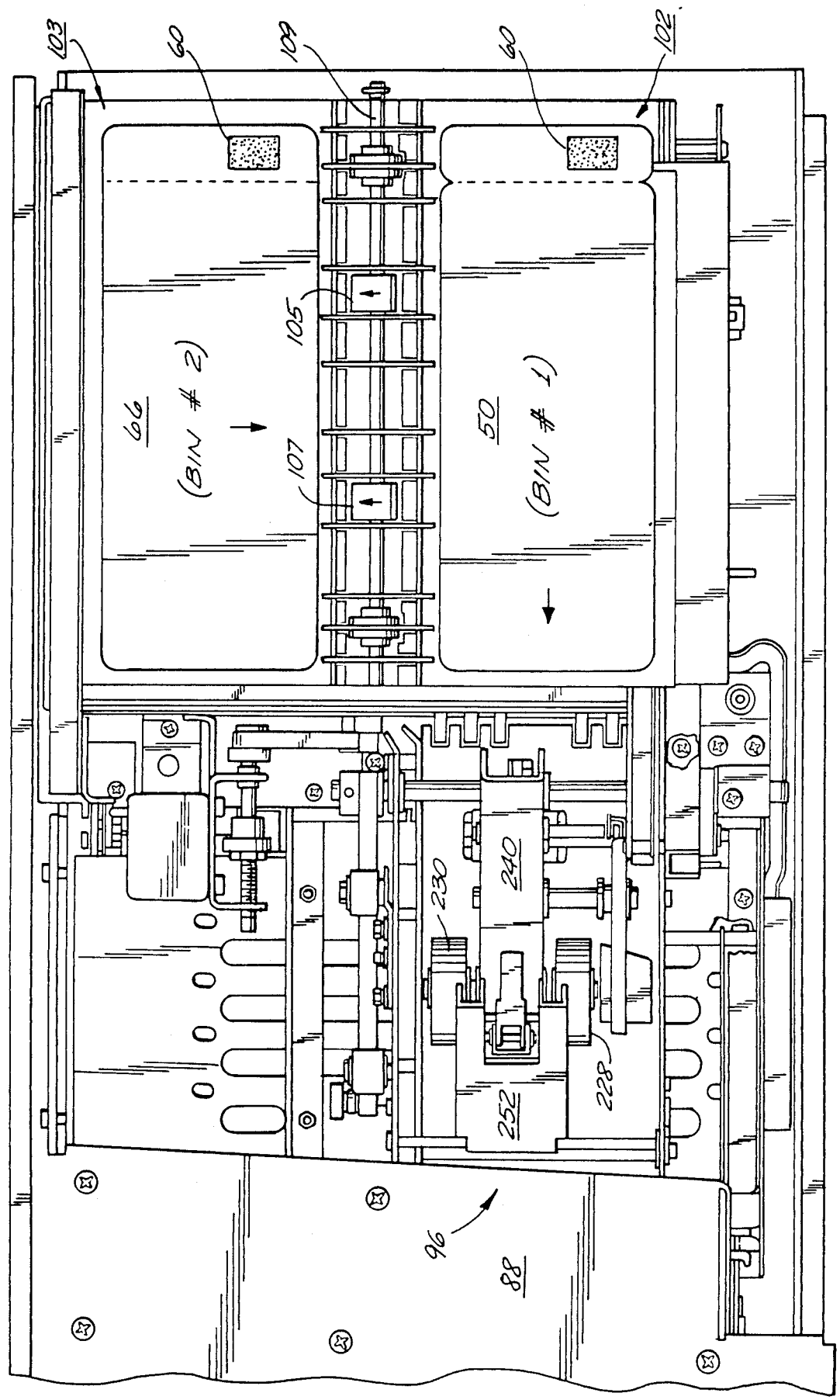
FIG. 6 is a top plan view of the printer shown in FIG. 5.

Now referring to FIGS. 5 and 6, and particularly to FIG. 5, the printer 44 includes a frame 84 and a front cover 85 with guides 86 near the bottom to guide the printer in its sliding movement inwardly and outwardly of its cabinet.

The printer includes an ion deposition print engine 88, a control panel 90, a magnetic record/reproduce section feed mechanism 96, and a hinged card transportation unit 98. The unit 98 contains a portion of the mechanism used to feed cards from stacks stored in a storage unit 100. The storage unit 100 is shown broken away in the lower right hand portion of FIG. 5 to expose a stack 102 of ticket forms 50 supported on a support plate 104 which is moved upwardly or downwardly by means of an elevator mechanism (not shown) to keep the height of the stack at a proper level.

FIG. 5A is a schematic view illustrating the flow path of forms to be printed in the printer of the present invention and FIG. 6 is a top plan view of the printer 44 of FIG. 5, with the card transport unit 98 removed to show the forms stored in the storage unit.

Referring to FIG. 5A, the forms are stacked in two stacks 102 and 103 which are moved upwardly by elevating the platform 104 and a corresponding platform for the stack 103 as needed to keep the tops of the stacks at a proper height. Forms move from the stack 102 along a guide 222 past a magnetic record/reproduce head 250 into the nip between the dielectric drum 109 and the pressure roller 111 of the print engine 88. This transfers the images from the drum to the form, and then pushes the printed form out of the printer. If forms 66 from the stack 103 are desired, they are fed sideways, in the direction of the arrow on form 66, towards the top of the stack 102 where they are fed along basically the same path as forms from the stack 102.

As it is shown in FIG. 6, the forms 50 and 66 are stored in two separate bins, Bin #1, and Bin #2. If desired, the forms in both bins can be the same so that Bin #2 provides additional storage for the same forms issued from Bin #1. Usually, the forms stored in the two bins will be different. For example, with ticket forms 50 stored in Bin 1, reservation confirmation forms 66 can be stored in Bin 2, and a ticket and a reservation confirmation can be issued to a given passenger by the mere use of one or more keystrokes on the keyboard of the input/output device 40.

Referring again to FIG. 5, the print engine 88 does not itself form a part of the invention and will not be described in detail herein. The print engine 88 is of the type described more fully in U.S. Pat. Nos. 4,160,257 and 4,267,556 for example.

FIG. 5B shows the print head 89 of the print engine 88. The print head 89 has a plurality of rows 91 of twelve very small holes 91 aligned at an angle to the direction D of movement of the sheets or forms through the print engine. The print engine produces ionization at selected ones of the tiny holes at pre-determined times to form latent electrostatic dots on the dielectric surface of the drum 109. Those dots form latent images which are developed by the application of magnetic toner, and the pressure roller 111 transfers the image to the forms and fuses the toner into the paper of the forms. The printed forms then are issued into an output tray 112 which holds the printed forms adjacent the opening 48 from which they can be removed.

The array of holes 1 in the print head extends across essentially the entire width W of each form; there are seventy of the rows 91. The print head is relatively short and economical to make because the width of the forms is relatively small.

The control panel 90 shown in FIG. 5 includes a key pad 94 for use in inputting specific instructions to the printer control circuit, performing diagnostic routines and maintenance, controlling the darkness of the printing, and other functions to be described below. A display 92 displays alphanumeric indicia indicating various operational parameters of the printer.

CARD TRANSFER DRIVE

Figure 7:
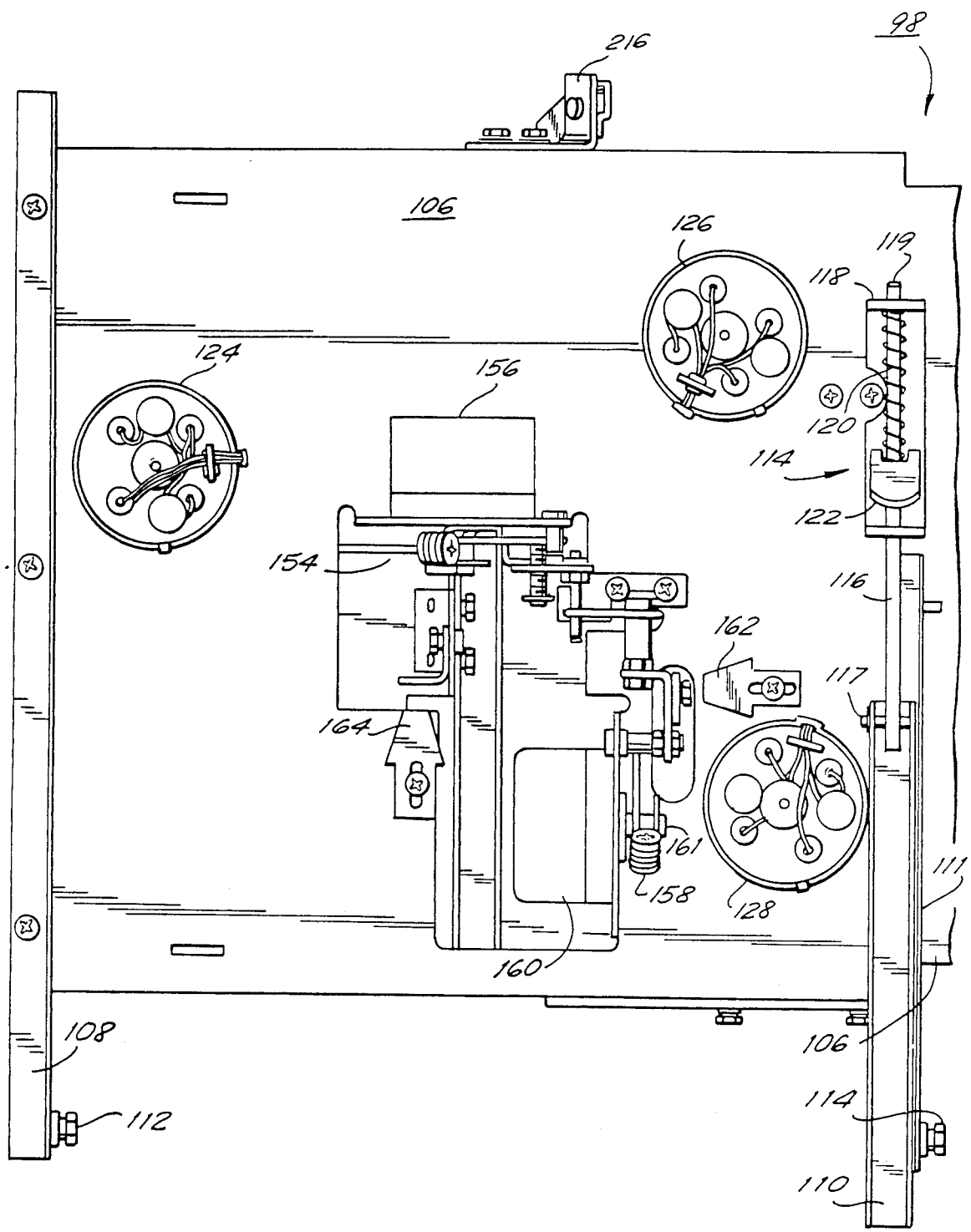
FIG. 7 is a top plan view of a portion of the printer unit shown in FIG. 5.
Figure 8:
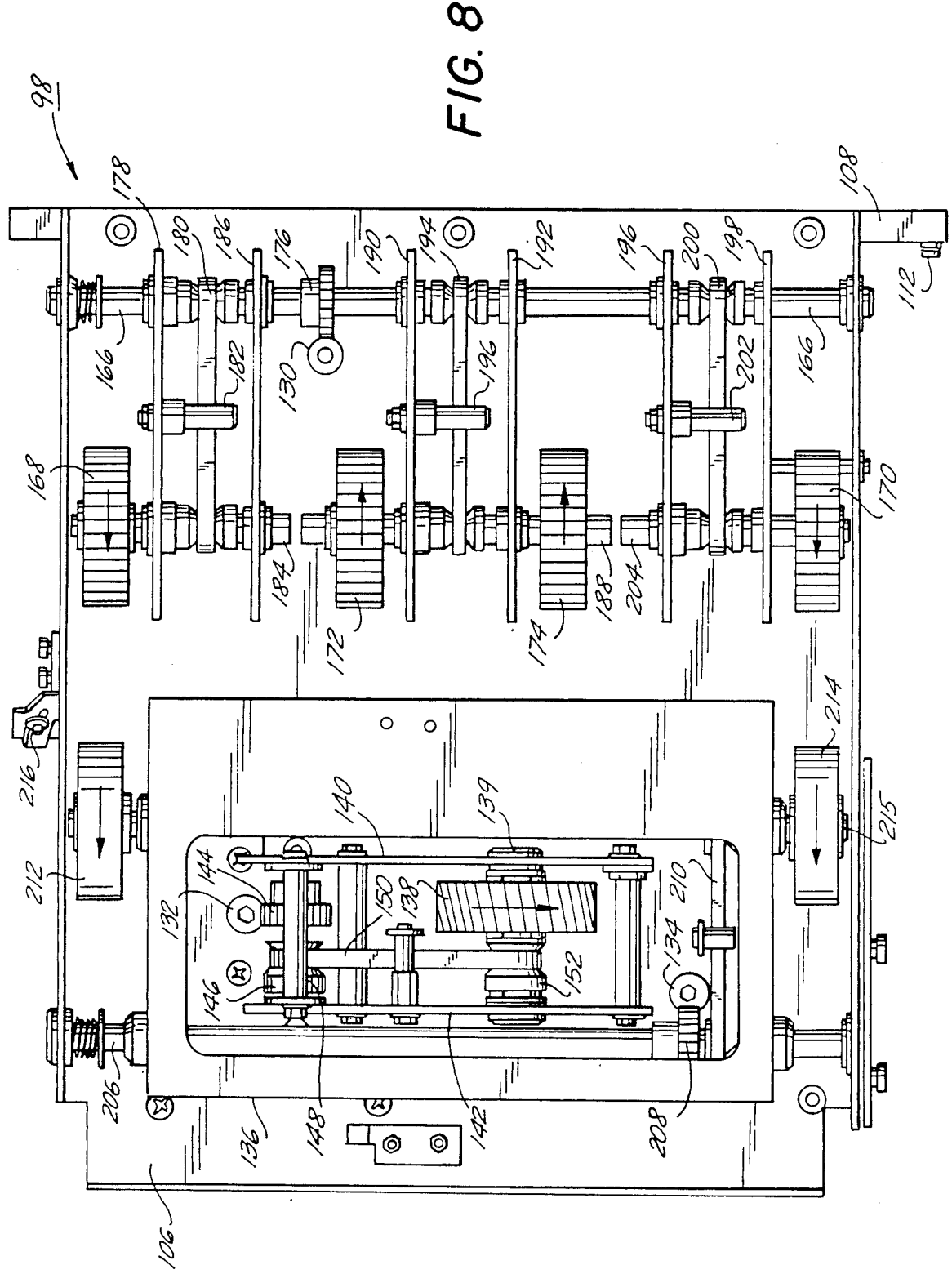
FIG. 8 is a bottom plan view of the structure shown in FIG. 7.
Figure 9:
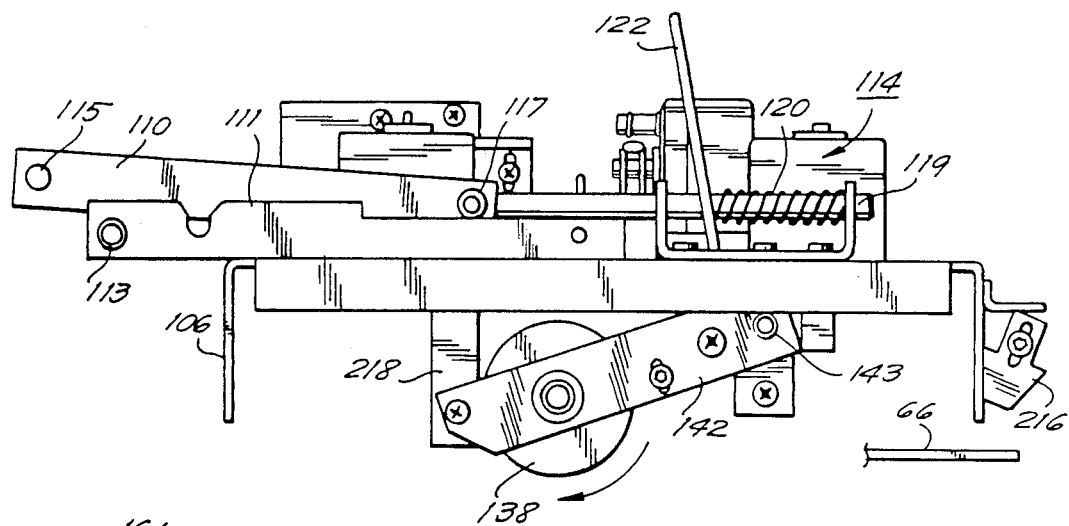
FIG. 9 is a right side elevation view of the structure shown in FIG. 7.
Figure 10:
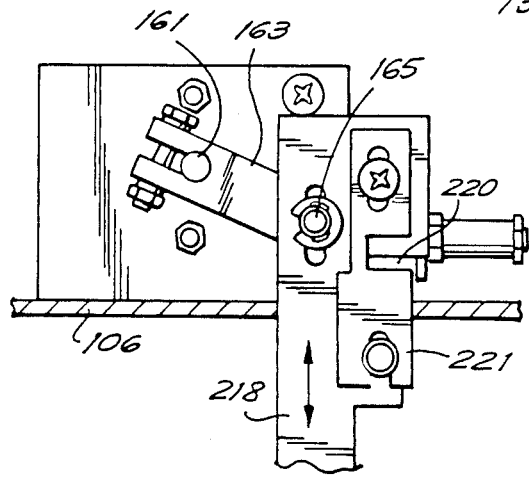
FIG. 10 is an enlarged perspective partially broken away view of a portion of the structure shown in FIG. 7.

The card transfer drive unit 98 is illustrated principally in FIGS. 7 and 8, and additionally in FIGS. 6, 9, and 10. The card transfer drive mechanism is used to move the coupon forms or "cards" from the stacks 102 and 103 to the magnetic recording/reproducing drive system 96.

FIG. 7 is a top plan view of the transfer mechanism 98 with the cover shown in FIG. 5 removed. The mechanism includes a U-shaped base plate 106 to which are secured a pair of extension arms 108 and 111 (also See FIG. 9). Pivot pins 112 and 114 extend from the ends of the arms 108 and 111 respectively and are pivotably mounted on the printer frame, for example at point 113 in FIG. 5. Thus, the unit 98 can be pivoted upwardly to a position such as that shown by the dashed lines 98' in FIG. 5 to provide access to the card storage bins and to the feed mechanism on the under side of the plate 106.

PROP MECHANISM

FIG. 7 shows the mechanism 114 used to prop the unit 98 up and prevent it from accidentally falling down and injuring someone or damaging the printer. The mechanism 114 includes a bracket 118 secured to the plate 106, a metal rod 119 extending through mating holes in the upstanding end portions of the bracket 118, a coil spring 120 encircling the rod 119, a locking plate 122, and a channel shaped support arm 110 which is pivoted at its end 115 (See FIG. 9) to a position in the printer frame to the left of the pivot point 113 for the unit 98. The rod 119 is secured at one end to the end of the support arm 110 by means of a pin 117.

The mechanism 114 is shown in FIGS. 5, 7, and 9 in the "down" position in which it is positioned for feeding cards. As the mechanism 98 is lifted and rotated about the pivot pins 112 and 114, the rod 119 slides easily through the holes in the bracket 118 and the hole in the locking member 122 so that the mechanism can be moved upwardly easily and smoothly. However, if at any point the mechanism 98 is released, the mechanism 114 instantly locks and prevents the mechanism from descending under its own weight and crashing down on an operator's hand or creating a jarring impact. This is done by interaction of the spring 120 and the plate 122.

As the rod 119 attempts to move back through the holes in the bracket 118, the spring pushes the plate 122 so as to tip it to the left as shown in FIGS. 5 and 9, and the resulting frictional engagement between the rod and 119 and the hole in the locking member 122 prevents further motion of the unit 98 in the downward direction until the operator grips the outwardly extending end of the locking member 122 and presses it towards the spring 120 to release the lock and allow the mechanism 98 to be lowered gently.

As it is shown in FIG. 5, a gripper member 123 is secured to the cover of the mechanism 98 so that the members 122 and 123 can be squeezed together to lower the unit 98 gently. If the operator's hand should slip during the descent of the mechanism 98, the mechanism will stop the fall instantly.

Thus, the mechanism 114 provides substantial protection from damage both for the printer and for the person using the printer.

DRIVE MECHANISM

Referring again to FIGS. 7 and 8, three drive motors 124, 126, and 128 are mounted on the plate 106 with their shafts extending through holes in the plate. Referring now to FIG. 8, the drive motor 124 is a reversible motor which drives a worm gear 130 and thus drives rollers in a cross-feed mechanism shown in the right central portion of FIG. 8. Similarly, the motor 126 drives the worm gear 132 and the "long feed roller" 138. The motor 128 drives the worm gear 134 to rotate other rollers of the cross-feed mechanism.. It should be noted that the propping mechanism 114 is omitted from FIG. 8 for the sake of clarity in the drawings.

FIGS. 8 and 9 show a "long feed roller" 138 which is used to feed cards from Bin #1 FIG. 6 longitudinally towards the feed mechanism 96.

The various feed rollers shown in FIG. 8 and elsewhere in the drawings are mounted on their respective shafts by means of one-way clutches. The convention used in the drawings is to indicate the direction of their free-wheeling rotation with arrows. Thus, rotation in the direction opposite to arrows creates a firm drive coupling between the roller and its shaft. The arrows also indicate the direction in which the rollers move the cards.

The long feed roller 138 preferably is a relatively soft rubber roller with teeth formed in its outer surface to grip the cards better. In accordance with one aspect of the invention, the teeth on the surface of the roller 138 are helical; that is, they are aligned at an angle to the shaft 139 on which the roller 138 is mounted. This is done so as to urge the card sideways towards an edge guide in the recording/reproduction section of the unit to insure accurate alignment of the magnetic track with the magnetic record/reproduce head 250 FIG. 11 located in that section.

The roller 138 is rotatably mounted in a bracket including side members 140 and 142 (also See FIG. 9). This bracket is pivotable about a point 143 FIG. 9 to raise and lower the roller 138 during operation of the card drive mechanism.

Rotation of the worm gear 132 drives a gear 144 which is coupled to a shaft with a pulley 146 on it. A drive belt 150 is connected between the pulley 146 and a pulley 152 on the drive shaft for the roller 138. Thus, the rotation of the motor 126 drives the long feed roller 138.

The following is the operation of the long feed roller in feeding a card out from Bin #1:

The long feed roller 138 rests upon the top card in the stack 102 in Bin #1. Upon receiving a command to issue a card from Bin 1, the motor 126 is turned on and this causes the long feed roller 138 to rotate to feed the card forward until its leading edge is sensed by an optical sensor 235 shown in FIG. 11 of the drawings, at a point just past the nip of the feed rollers 228 and 230 of the feed mechanism 96. When the leading edge of the card is sensed at that position, the card has been gripped by the rollers 228 and 230. This causes the long feed roller 138 to be lifted by a rotary solenoid 160 operating a lifting arm 218 FIGS. 9 and 10 which is pivotably attached to the frame supporting the long feed roller 138. The rotary solenoid 160 drives a shaft 161 FIG. 10 which is pinned at 165 in a slot in the lifting arm 218.

When the mag feed sensor 235 senses the trailing edge of the card, this causes the rotary solenoid 160 to release and drop the long feed roller 138 back down into contact with the top card on the stack in Bin #1 to prepare for the next feeding action.

CROSS-FEED MECHANISM

When it is desired to feed a card from Bin #2 instead of Bin #1, the cross-feed mechanism shown in FIG. 8 is utilized. A long shaft 166 is rotatably mounted between the end portions of the support plate 106 for the unit 98. The shaft 166 is rotated by the motor 124 in a first direction through the worm gear 130 driving a gear 176 which is secured to the shaft 166.

Two sets of feed rollers are driven off of the shaft 166. Two of these are forward feed rollers 168 and 170, and the others are top "stripper" rollers 172 and 174. The rollers 168 and 170 are rotatably mounted in a support structure, a portion of which is shown at 178 and 186. A pulley on a shaft 184 and another pulley on the shaft 166 are joined by a drive belt 180 running on an idler roller 182.

Similarly, the roller 170 is rotatably mounted in a support structure 196, 198 and is driven by a belt 200 running on an idler 202.

The stripper rollers 172 and 174 are mounted on a common shaft 188 and are driven by means of a drive belt 194 and pulleys on the shafts 188 and 166.

Each of the rollers 168, 170, 172, and 174 preferably is made of a soft rubber roller and has straight teeth in its surface; that is, the teeth are parallel to the shaft on which the roller is mounted.

Also shown in FIG. 8 are two pick-up rollers 212 and 214 rotatably mounted on a shaft 215 which is mostly hidden in FIG. 8 by a support housing 136. The shaft 215 is rotated by the drive motor 128 shown in FIG. 7 through the worm gear 134 shown in FIG. 8, and a gear 208 secured to a rotatably mounted shaft 206. A belt 210 mating with pulleys on the shafts 206 and 215 transfers the rotary motion of the motor 128 to the rollers 212 and 214.

The rollers 212 and 214, like the long feed roller 138, can be raised and lowered. FIG. 7 shows the mechanism 154 for doing this with the aid of a rotary solenoid 156. The mechanism will not be shown in detail, but is similar to that used in lifting and lowering the long feed roller 138.

Secured to the frame 106 is a position sensing element 216 (See FIGS. 7, 8, and 9). The sensor 216 is of the type which shines light on a nearby object, senses the reflected light and creates a corresponding signal. A control signal is developed when the sensor senses a significant change in the reflectivity of the surface it observes. The same type of sensor preferably is used as the sensor 235 FIG. 11 to sense the leading and trailing edge of the card in the mag drive unit 96.

The alignment of the edge of the card 66 with the sensor 216 is illustrated in FIG. 9. Thus, the sensor 216 is positioned to sense the passing of the black rectangular spot 60 (See FIGS. 2, 3, and 6) as it passes by. The spot 60 is used to time the action of the various cross-feed rollers, as it will be explained below.

The operation of cross-feeding a card from Bin #2 to Bin #1 now will be described:

When the control circuitry of the system detects a request to feed a card from Bin 2, the long feed roller 138 is lifted so as to allow a card to be cross-fed onto the top of the stack in Bin #1. The motor 124 is started in the forward direction. This causes forward feed rollers 168 and 170 to move the top card on the stack in Bin #2 towards Bin #1. Because the one-way clutches for rollers 172 and 174 are of a type opposite to those for the rollers 168 and 170, at this point in time the rollers 172 and 174 are idling or "free-wheeling". The card from Bin 2 thus moves sideways until the leading edge 61 (See FIG. 3) of the dark spot 60 is sensed by the sensor 216. When this happens, the pickup rollers 212 and 214 are started; that is, motor 128 is started.

The card continues to be cross-fed by the combination of the forward feed rollers 168 and 170 and the pickup rollers 212 and 214 for a pre-determined distance until the trailing edge 63 (See FIG. 3) of the card is sensed. This stops the drive for the feed rollers 168 and 170, and causes the motor 124 to reverse its direction of rotation and drive the stripper rollers 172 and 174. The stripper rollers engage the card immediately beneath the top card which has just passed from the grips of the rollers 168 and 170 to feed that and other cards back to the stack in case it has, or they have been dragged along with the top card on the stack.

FIG. 6 shows a pair of bottom stripper rollers 105 and 107 mounted on a shaft 109 which is rotated at this time to engage the bottoms of any cards which have been inadvertently moved off of the stack and return them to the stack from which they came.

The top card continues to be cross-fed towards Bin 1 until the trailing edge 65 of the card 66 (See FIG. 3) is sensed by the sensor 216. This causes the pickup rollers 212 and 214 to be lifted and the long feed roller 138 to be dropped onto the card which has been transferred into Bin 1. At this point, the procedure described above for feeding cards from Bin 1 is followed to feed the card to the magnetic recording/reproducing station.

One of several notably features of the card transfer system described above is the feeding of cards alternatively from one or the other of two bins located side-by-side. This contrasts favorably with feeding mechanisms in which Bin 2 might be located longitudinally with respect to Bin 1. The use of the cross-feed mechanism greatly reduces the length of the printer mechanism and makes use of space which otherwise might be wasted. This makes the unit more compact.

Another advantage is that if there is a malfunction of the cross-feed mechanism such that it throws the card into Bin 1 too hard, the wall in bin 1 will stop it and it will come to rest at the proper location. This might not be true if the card were being fed longitudinally into Bin 1. Since the card is traveling in the same direction as that in which it will be fed to the next section of the printer, if the card over-shoots the mark it probably will arrive at the next destination sooner than the equipment sensors expect, with misfeeding as the result.

Another notable feature of the cross-feed mechanism is that the mechanism is made more compact and the number of drive motors required is reduced by the use of a single motor to drive both the forward feed rollers 168 and 170 and the top stripper rollers 172 and 174.

CARD HEIGHT STACK SENSORS

Referring now to FIGS. 7 and 10, the height of the card stacks in the storage bins are sensed by optical sensors 162 and 164 FIG. 7, which are of the same type as the sensor 216. Sensor 162 senses the height of the stack in Bin #1, and sensor 164 senses the height of the stack in Bin #2.

FIG. 10 shows a gap 220 which is formed in the upper portion of the member 218 used for raising and lowering the long feed roller 138. Light from the sensor 162 is directed towards a location vertically aligned with the gap 220.

If the long feed roller drops so far that the gap 220 is aligned with the sensor 162, the sensor is activated, and this causes the card stack elevator to lift the stack higher to adjust. When the long feed roller rises again, the sensor 162 is not affected because the vertical extent of the portion 221 of the member 218 is sufficient to intercept light from the sensor with the roller at all levels higher than the gap 220.

Thus, the same mechanism is used for a dual purpose; the roller lifting mechanism is used both to lift and drop the roller, and to indicate stack height.

A similar mechanism is used with the sensor 164 to sense the stack height in Bin #2.

MAGNETIC RECORD/REPRODUCE CARD DRIVE

Figure 11:
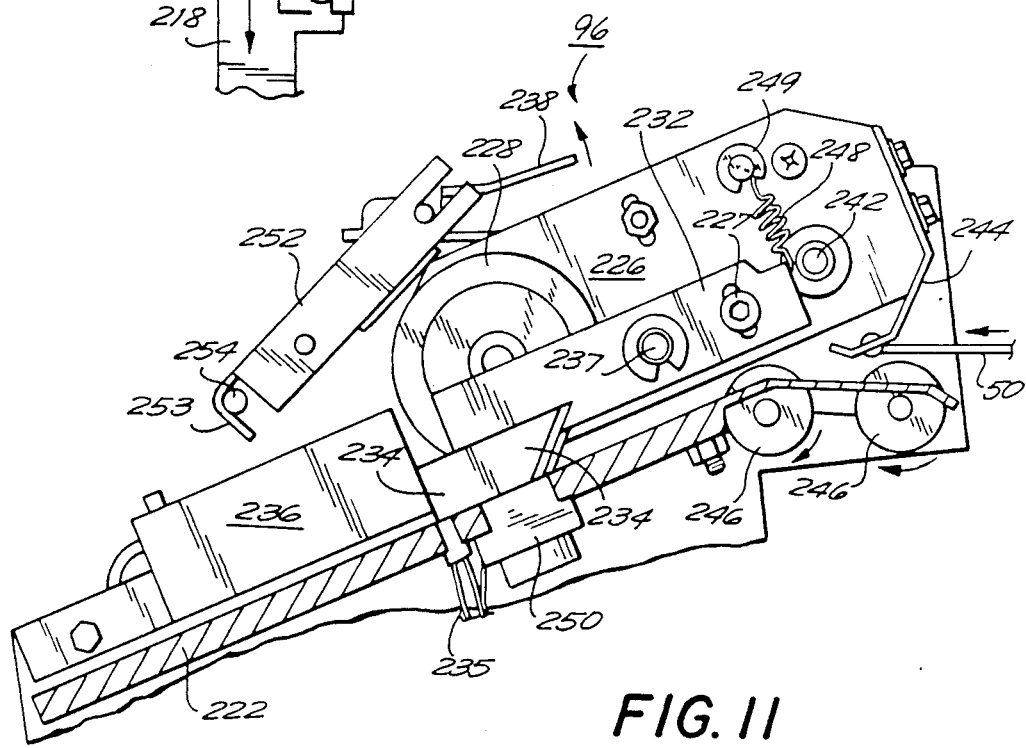
FIG. 11 is a cross-sectional view, partially schematic, of a portion of the magnetic recording/reproducing section feed mechanism of the printer of FIG. 5.

The feed mechanism 96 for moving the cards past the magnetic record/reproduce head 250 is shown in FIGS. 11 and 12, as well as in FIG. 6.

A base plate 222 forms a downwardly-sloping surface on which the cards are moved. As it is shown in FIG. 12, an edge guide 224 is located along one side of the plate 222. The record/reproduce head is mounted in a hole in the plate 222, as is the sensor element 235. A pressure foot 234 is provided to urge the portion of the cards bearing the magnetic stripes against the surface of the record/reproduce head 250.

Just downstream from the rollers 228 and 230 is located a "double pick" detector 236 whose function is to detect the simultaneous feeding of two or more cards and stop the feeding of cards.

The entrance to the unit 96 is shown at the right in FIG. 11. A spring element 244 is mounted at the upper portion of the entrance in order to block the passage of any large quantities of cards which have become stuck together and are being fed in a group. In addition, bottom stripper rollers 246 are provided to strip off and return to Bin 1 all cards in excess of the top card to be transported. The stripper rollers 246 are conventional and the drive system for driving them will not be described.

The pressure foot 234 is made up of a smooth, wear-resistant non-magnetic material such as Delrin plastic material. As it is shown in FIG. 12, the leading edge 233 of the pressure foot 234 is canted or sloped towards the edge guide 224. Thus, when the leading edge of the card reaches the pressure foot, if it is not flush against the edge guide 224, the sloping leading edge of the pressure foot urges it towards the edge guide. This assures that the edge of the card will be against the edge guide, and that the magnetic stripe on the card will be aligned properly with the magnetic record/reproduce head 250.

It should be noted that there are a number of different magnetic recording tracks on the magnetic stripe, so that accurate alignment between the plurality of separate record/reproduce elements within the head 250 is necessary. Preferably, four or more tracks can be formed on a stripe approximately five-eighths of an inch or 1.6 cm. wide. Of course, more tracks can be used if desired, with a commensurate increase in accuracy requirements as the number of tracks per unit of stripe width increases.

The pressure foot 234 is pivotably mounted on an arm 232 which is pivoted at 237. A spring 248 is connected to the other end of the arm 232, and to a pin 249 secured to the frame. The spring 248 supplies a pre-determined amount of force which translates into a pre-determined amount of pressure to be applied by the pressure foot 234. A shaft 227 mounted in the housing 240 extends through a slot in the arm 232 to limit the amount of movement of the arm.

Referring to both FIG. 11 and 12, two feed rollers 228 and 230 are mounted on a common shaft which is rotatably mounted in a structure including a top wall 240 and side walls 226. This structure is pivoted on a shaft 242 which is driven by a motor (not shown). A pair of pulleys mounted on the shaft 242 and the shaft on which the drive rollers 228 and 230 are mounted, together with a belt (not shown) are used to rotate the rollers 228 and 230. The rollers 228 and 230 mate with pinch rollers 255 FIG. 16 located on the underside of the plate 222 and extending through holes in the plate to its upper surface.

The housing 240 is rotatable about the shaft 242 to swing it, the feed rollers 228 and 230 and the pressure foot 234, out of the feed path for cards so that an operator can insert a hand into the area to remove or reposition cards which have become stuck or are not being fed properly.

The mechanism described so far is secured in the down position by means of a latch consisting of a plate 252 with a hooked lower end 253 which, when in the latched position, embraces and is hooked over a rod 254 which spans the sides of the card feed guide. The mechanism is latched shut by means of a latch lever 238 rotatably mounted on a rod or shaft 239 operating, together with a pair of springs 256 (See FIGS. 16–17), as a toggle linkage.

Referring now to FIG. 11, rotation of lever 238 in a counter clockwise direction (the direction indicated by the arrow in FIG. 11), operates the toggle mechanism and releases spring pressure holding the feed mechanism down. This allows the hooked end 253 to be lifted off of the rod 254 and allows the whole mechanism to be pivoted up and around shaft 242.

When it is desired to return the mechanism to the down position, the procedure is reversed. The hooked end 253 is hooked over the rod 254 and the latch lever 238 is rotated clockwise from its laid back position (shown in FIG. 16) until it toggles and latches the mechanism shut. The springs 256 apply pressure to the frame 240 and this applies pressure in a desired amount to the rollers 228 and 230 and to the pressure foot 234.

FIG. 16 and 17 are cross-sectional views taken along lines 16—16 of FIG. 12 and further illustrate the operation of the latch mechanism. In the position shown in FIG. 16, the hooked end 253 of the plate 252 has been hooked over the bar 254. One of the two springs 256 is mounted on each side of the mechanism. Each spring 256 is connected between a pin 259 at one side of the mechanism and to the rod 239. The right end portion of the lever 238 extends beyond the pin 239 and is pivoted at 245 to the end of a member 243 extending upwardly at an angle from the body 240.

FIG. 17 shows the latch in its final locking position. The lever 238 has been rotated through approximately 180° around the pivot point 245. As the lever 238 rotates, this lengthens the distance between the bar 239 and the pin 259 so as to stretch the spring 256. Simultaneously, the bar 239 slides outwardly in slots 241 in the side walls of the latch mechanism. This applies force from the spring 256 to the body 240 and causes the roller 228 to be pressed downwardly in engagement with the idler roller 255 extending through the hole in the plate 222.

When the lever 238 has moved clockwise past a position in which it is aligned with the spring, the toggle action has been completed; in order for the mechanism to snap back to the position shown in FIG. 16, the mechanism would have to stretch the spring 256. This cannot be done without the application of external force, and the mechanism is locked shut with a simple toggle action.

MULTIPLE CARD FEED DETECTOR

FIG. 13 is a cross-sectional view of the "double-pick" detector unit 236. The device 236 includes a Delrin plastic metal body 257 with a hollow elongated cavity 258 extending longitudinally in a direction generally parallel to the surface of the card support plate 222. Mounted in the cavity by means of a pair of brackets 260 and 262 and a setscrew 268 at the right end of the cavity is a piezoelectric crystal 263 and a damping spring 264 extending laterally into the cavity 258. The crystal and spring combination are mounted as a relatively long, thin cantilever beam so that the crystal will bend readily when its left end is pressed upwardly.

Mounted in a vertical hole is a piston 265 with an enlarged, rounded head 266. The piston is free to slide upwardly and downwardly in the hole, and is positioned and dimensioned so that its upper end 269 bears against the left end of the crystal beam 263 and bends it upwardly as the piston moves upwardly. The rounded head 266 attached to the piston moves upwardly and downwardly in a recess having a depth D.

The double pick detector operates to detect a condition in which two or more cards are traveling through the mag card feeder section 96. Cards travel in the space 271 between the bottom of the detector 236 and the card support plate 222. The leading edge of the card hits the rounded head 66 on the piston 265 and drives the piston upwardly. This bends the piezoelectric crystal and creates electrical signals on the output leads 270 from the crystal which are sent to a level detector circuit 273. The output voltage is proportional to the distance moved by the end of the crystal beam 264. FIG. 13A shows the voltage wave forms for the output signals on leads 270. The peak voltage "A" produced by single card is insufficient to trigger the level detector 273, which is set to detect voltages "X" much higher than "A".

If two cards move through the space 271 simultaneously, the piston will be driven upwardly by a distance twice that for a single card. This will create an output voltage "B" which is twice that for a single card. When it detects such a level, the printer control circuitry immediately turns off all feed motors so that the printer stops, warning lights go on, and indicator lights tell the operator of the problem. The machine cannot be restarted until the double card situation is corrected.

Of course, in accordance with the invention, the correction can be made easily by simply sliding the printer out of its cabinet (or opening its own cabinet, if it is a stand alone unit), lifting the feed mechanisms 96 and 98, removing the two cards, returning them to the appropriate bin, lowering the feed mechanisms 96 and 98, and re-starting the machine.

By this means, the serially-numbered and intrinsically valuable coupon forms are not lost or destroyed, and the wasting of other forms is minimized.

The double-pick detector is very sensitive and accurate, and yet it is relatively simple, rugged and inexpensive to make.

Now considering the double-pick detector operation in greater detail;

When a double-pick is detected, the level detector 273 FIG. 13 will send a square wave output pulse for as long as it senses an input above its trigger level. The output pulse is sent to a microprocessor forming part of the control system. The start of the pulse creates a command which sets off an interrupt sequence. Then an error command is sent through the print engine control system to disable motors 124, 126, and 128 and the mag feed motors, and a multiple tone alarm is triggered. This alarm is completely unique to the multiple pick detector and should alert the user that one and only one type of error has occurred, namely the double pick detection. Along with the alarm sounding, and LED is illuminated. This LED has an error label on it, but provides no specific notice of what type of error has occurred. However, the display 92 on the control panel 90 FIG. 5 displays the message that a "multiple pick" has occurred. This "multiple pick" message has priority over all other messages contained within the system and will be written over the current contents of the key pad.

At this point, the machine has been completely disabled, and the user is required to open the machine, correct the condition, and return the machine to its cabinet before operation may resume.

At the same time that the system has been disabled, a message is stored in a static RAM in the control circuit, thus counting the number of such events. This static RAM has a battery backup so that, in the event of a power failure, an inerasable record will be kept of the number of times a multiple pick has occurred in a given machine.

The static RAM also stores the number of total card jams per machine, the number of card jams occurring from Bin 2, and the total number of tickets that the machine has printed.

In one embodiment of this machine, a message is sent out over two-way communications means to the host computer that controls the ticket printer, telling the host that a multiple pick has occurred so that it can store a count of the occurrences.

The trigger level X of the level detector 273 is deliberately set at a level closer to the peak value B of the double-pick signal than to the peak value A of the single-card signal. This is done to discriminate crumpled front edges of cards from double cards by use of the fact that usually, the crumpled edges will not generate a high enough signal to trip the level detector.

TONER BRUSH SHIFTING

One of the problems with printing vehicular passenger transportation documents such as airline tickets and coupons is that the coupons are fed through the printer at a relatively high speed "on demand". Thus, the forms are fed through the print engine with substantial spacing between the forms. Since the dielectric drum of the print engine continues to rotate, it attracts a certain amount of toner material from the toner applicator which then forms unwanted marks on subsequent coupons which are printed.

This problem is solved in a very simple manner by simply rotating the toner brush or applicator to a position in which it is ineffective to deposit toner on the portions of the drums which will not contact any sheets to be printed, and returning the brush to an effective position for areas which will do the printing.

FIG. 14 is a partially schematic drawing depicting this feature of the invention, and FIG. 15 is a cross sectional view of the magnetic toner brush 280 used in the print engine. The toner brush 280 is entirely conventional. It comprises an outer cylindrical housing 304 with an inner magnetic structure 306 mounted to rotate within the housing 304. At the right end of the structure shown in FIG. 15 is shown a shaft 308 which is secured to the outer housing 304. At the left end is shown a second shaft 310 with a flattened end 312. The shaft 310 is secured to the inner rotor 306.

As it is shown in FIG. 14, the toner magnet structure is such that eight alternating north and south poles are formed at 45° intervals around the circumference of the brush. Magnetic toner particles are dispensed from a toner hopper indicated generally at 282 and form a mass of toner material at 284 in contact with the brush. A small gap 285 at the bottom of the toner hopper dispenses a thin layer of toner material onto the magnetic brush surface. The outer shell or drum 304 is rotated continuously by means of a motor (not shown) drivably coupled to the shaft 308. However, the shaft 310 is held stationary so that the location of the eight magnetic poles on the toner brush surface remains constant. Normally a knob or other adjustment means is attached to the flat 312 on the shaft 310 to allow the positions of the magnetic poles to be rotated slightly in order to provide an adjustment giving optimum transfer of toner material from the magnetic brush to the drum surface.

The toner material forms a thin sheet around the periphery of the magnetic brush, but forms long ridges lengthwise of the brush which, in cross-section, look like lobes, and will be referred to as such herein. Seven such lobes are shown in FIG. 14; lobes 286, 288, 290, 292, 294, 296 and 298. Only the lobe 286 is used to deposit toner.

In actual practice in the ion deposition printer of the present invention, the ideal position for the lobe 286 is at an angle of approximately 14° clockwise from a horizontal center line common to the drum and the magnetic brush cylinder.

In order to prevent deposition of toner on portions of the drum where it is not wanted, applicants have adopted the simple expedient of normally locating the lobes nearest the drum at locations 300 and 302. In these positions, both lobes are too far from the drums to deposit any toner on the drum surface. Then, when it is described to apply toner to the drum, the shaft 310 is rotated by approximately 17° counter clockwise to a new position 286 at which it is effective.

When it is again desired to develop latent electrostatic images to be printed, the shaft 310 is rotated back to its starting position so that the lobe at location 286 will develop the images.

The mechanism for shifting the toner brush in this manner is illustrated in FIG. 5. The mechanism includes a linkage consisting of a first link 314 pivoted at one end to a second link 316 which is pivoted to a clamp attached to the shaft of a rotary solenoid 318. The other end of the link 314 is clamped to the flat end 312 of the shaft 310. The rotary solenoid is set to move the required distance, when energized, to activate the toner brush, and to return to its starting position to deactivate the brush again.

TONER BRUSH DRIVE

The means for solving or alleviating the problems of uneven application of toner to the dielectric drum and accumulation of toner discussed above is shown in FIGS. 28 and 28A.

FIG. 28 is a partially schematic elevation view of the drum and toner brush drive arrangement, and FIG. 28A illustrates the timing sequences for the separate motors driving the toner brush and dielectric drum.

In the past, where the toner brush was driven by the drum, piles of toner such as that shown at 1422 in FIG. 28 were accumulated. This caused unwanted toner deposition on the drum, and wasted toner. The solution to this problem was not readily apparent but has been achieved by the means described below.

FIG. 28 shows a stack of coupons 50 and the long feed roller 138 also shown in FIGS. 8 and 9 for feeding the coupons along the guide 222 (FIGS. 11, 16 and 17) past the magnetic recording and reading equipment (not shown in FIG. 28) towards a pair of pinch rollers 1405 and 1407 which are not shown elsewhere in the drawings. These rollers stabilize the speed of the documents and further urge them down the guide towards the nip between the drum 109 and the pressure roller 111.

The dielectric drum 109 is rotatably mounted on a shaft 1423 and is rotated by a motor 1401 through a V-ribbed drive belt 1419 and a drive gear 1421. During the printing cycle for a group of related documents for which a Document Interactive Record ("DIR") is stored in the central computer, motor 1401 rotates the drum 109 continuously.

The outer drum 304 of toner brush 280 (also see FIGS. 14 and 15) is separately driven on the shaft 308 by a torque motor 1403 through a toothed drive belt 1413 and gear 1411. Toner material 284 is deposited from toner hopper 282 through the small gap 285 at the bottom of the toner hopper onto drum 304 continuously as this drum rotates (also see FIG. 14).

Referring again to FIG. 28, a document position sensor 1409 detects the leading edge of a document traveling on guide 222 and sends a signal to the electrical system 601 (shown in FIG. 19) which processes this information along with signals from sensors (not shown) detecting the speed of the documents and the speed of the drum 109. Electrical system 601 sends a signal over output lines 619 (also shown in FIG. 19) to print head 89 (also see FIG. 5B) to begin the formation of latent electrostatic images on the dielectric surface of the drum.

After a brief delay to allow the leading edge of the image on the drum to travel from its position adjacent print head 89 to a position just above lobe 286 on the toner brush, a second output signal on output lines 619 activates rotary solenoid 318 (FIG. 5) to shift lobe 286 to a position where it is effective to transfer toner to the drum 109.

This same signal also activates the toner brush drive motor 1403 to rotate the toner brush outer drum 304 which causes toner material to be dispensed from hopper 282 onto the latter drum.

Motor 1403 is a high output torque motor, such as a non-syncronous, 24 volt, D.C., high output torque motor manufactured by Yaskawa Electric Manufacturing Co., Ltd. It has a rated torque of 8.3 oz. inches and a peak rated torque of 30 oz. inches. Its rated inertia is 0.86 oz. in. sec.$^2 \times 10^{-3}$. The output of motor 1403 is adjusted by varying its voltage input such that at steady state it rotates toner brush outer drum 304 at approximately 400 r.p.m. Because of its relatively high torque and rated inertia, motor 1403 quickly reaches substantially its steady state speed before the leading edge of the image to be printed reaches lobe 286 to receive toner.

After the images to be printed on the document travel on dielectric drum 109 past the lobe 286, a third signal on output lines 619 causes both solenoid 318 and motor 1403 to deactivate. This deactivation results in lobe 286 returning to its inactive position (shown in FIG. 28) and the dispensing of toner material 284 from hopper 282 onto the outer drum 304 of the toner brush to terminate. Motor 1401 continues to rotate dielectric drum 109, however, until all documents in the DIR have been printed.

FIG. 28A plots motor speed versus time, and thus illustrates the timing sequences for the operation of motors 1401 and 1403 during the printing of the documents in one DIR. The DIR in this example has four coupons to print. The leading edge 1429 of waveform 1425 represents the transition of motor 1401 from standstill to full steady-state speed. This transition occurs prior to the beginning of the formation of images by print head 89 on dielectric drum 109 for the first document in the DIR. Motor 1401 continues to rotate the drum 109 until after the printing of the last document in the DIR.

Waveform 1427 illustrates the operation of rotary solenoid 318 and motor 1403 during the printing of the documents in the DIR. Motor 1403 and solenoid 318 are turned on shortly before the area on the drum bearing the image for the first document in the DIR reaches lobe 286, and remain on until shortly after that image travels past the lobe 286, at which time they are turned off. This motor and the solenoid are turned on and off in the same manner for the printing of each subsequent document in the DIR, until all documents have been printed. At that time, both motor 1401 and solenoid 318 are turned off.

The period "B" in waveform 1427 represents the time during which the motor 1403 and solenoid 318 are turned on, and the period "A" represents the time between the leading edges of successive documents in the DIR as they travel down the guide 222. For the printing of airline coupons (around 8 inches long), "A" is approximately 1.2 seconds.

The motor 1401 rotates the outer surface of dielectric drum 109 at approximately 21 inches per second. Since airline coupons receive approximately seven inches of printing per coupon, approximately 0.3 seconds are required to print each airline coupon in a DIR. Under these circumstances, it has been found that the optimum period "B" is approximately 0.5 seconds. This period provides approximately 0.1 second lead time before the image for the document begins passing the toner brush, and approximately 0.1 second lag time for the continued application of toner after the image passes.

The combination of simultaneously shifting the toner brush lobes and turning off of the toner brush motor when non-image-bearing spaces on the dielectric drum are moving past the brush markedly improves the quality of the printing and reduces toner wasting and accumulation.

The immediately foregoing features of the invention satisfy the objectives set forth above. The separate drive sources for the dielectric drum and the toner brush minimize or substantially eliminate toner deprivation and uneven blackness of the printing.

Surprisingly, the operating speeds of the separate drive motors need not be closely matched. Thus, relatively low-cost D.C. motors can be used instead of more costly speed-regulated motors such as synchronous motors.

Operating the toner brush intermittently only when latent image-bearing areas of the dielectric drum are passing by it has been found to minimize wasting of toner and the accumulation of wasted toner, thus reducing maintenance, labor and operating costs.

In addition, the foregoing improvements are achieved, surprisingly with little or no increase in manufacturing cost despite the addition of another drive motor.

The resulting improvements in quality of the printing are notable. The result is less dark background, more even blackness, and cleaner printed documents.

ELECTRICAL CONTROL CIRCUITRY

For the most part, the electrical circuitry used for controlling the operation of the electric motors, solenoids, and other electro-mechanical components of the printer are conventional and need not be described. However, certain inventive features have been described above, and others will be described below.

FIRING CIRCUIT

FIG. 18 shows a firing circuit for use in producing the ionization at selected ion deposition holes in the print head 89 to form latent images on the drum 109.

The improved firing circuit includes a transistor 524, a bias resistor 522, and an input resistor 520. The collector of transistor 524 is coupled to the parallel combination of a capacitor 526 and a resistor 528. A timing circuit including a capacitor 530 and two resistors 528 and 532 is provided.

One lead of the capacitor 530 is coupled to the gate lead of a MOSFET transistor 540, as well as to one lead of resistor 532.

An oscillator circuit is formed. The oscillator includes a capacitor 538 and a transformer 544 with a tapped primary winding. The transformer is designed to convert 110 volts DC to 2600 volts AC on its secondary winding. A capacitor 538 is connected between the tap of transformer 544 and the cathode of diode 534 and to the source lead S of the MOSFET 540. Also, one end of resistor 542 is connected between the cathode of the diode and ground. The anode of diode 534 also is connected to ground.

There are twelve of the circuits shown in FIG. 18, one for each of the twelve holes in each of the seventy arrays of holes across the width of the print head.

Each firing circuit is enabled by the leading edge 523 of a negative-going pulse of width W FIG. 18 applied to the base lead 521 of the transistor 524. During the remainder of the 208 micro second enablement cycle, each of the other of the twelve firing circuits is enabled in sequence. While each circuit is enabled, a shift register circuit (not shown) uses the output of the firing circuit to allow ions to escape through one hole in each of the seventy arrays in which ionization is programmed to occur in order to form images.

The negative-going edge 523 of the enabling pulse creates a corresponding signal on the gate lead C of the MOSFET 540 to turn it on and start the oscillator.

The trailing edge 525 of the enabling pulse turns off both of the transistors 524 and 540 and stops the oscillator.

In accordance with one aspect of the invention, the timing circuit consisting of the capacitor 530 and resistors 528 and 532 serves to automatically turn off the firing circuit in case the enabling pulse accidentally remains turned on—a situation which can cause streaks in the printing, if it occurs.

The voltage across the capacitor 530 decays, with time, to a level such that the MOSFET transistor 540 turns off and stops the oscillator. The time constant RC of the timing circuit is such that the transistor 540 is not turned off by the timing circuit until a substantial time after the trailing edge 525 should have occurred—that is, until more than 6 microseconds have elapsed after the leading edge 523 is produced.

This feature provides reliable turn-off of the firing circuit and minimizes streaking in the printing.

In accordance with another feature of the invention, the darkness of the printed images can be controlled by varying the width W of the enabling pulse. A larger pulse makes the printing darker, and a shorter pulse makes it lighter. The length of the pulse can be controlled by software, and can be set by use of the key pad 94 FIG. 5.

Advantageously, the width W can be varied to compensate for changes in altitude at which the printer operates; the lower the altitude, the higher the ambient pressure and the greater the required pulse width, due to the effect of ambient pressure on the ionization process. It has been found, for example, that settings of 6 microseconds at sea level produce printing of about the same blackness as settings of 3.5 microseconds at relatively high altitudes.

This blackness control feature is very fast, convenient and easy to use.

PRINT ENGINE CONTROL CIRCUIT

FIG. 19 is a schematic circuit diagram of the electrical system 601 which controls print engine 88 of the printer 44.

A bi-directional input/output circuit 602 receives data from the systems processor circuit. The data received from the system processor has already been formatted into standard airline forms. This relieves the print engine control circuit from performing this task. Generally, one page of data is received at a time. The input/output circuit 602 is also capable of transmitting error and system status messages from the print engine control circuit to the system processor.

The input data is loaded into a dynamic random access memory ("DRAM") circuit 620 under the control of a microprocessor 604 which is in turn controlled by a 15 MHz clock 606. The DRAM 620 stores the data until it is called for during the subsequent printing of a ticket or coupon.

Ultimately, signals are output over several output lines 619 to control the firing of the firing circuits and the formation of images on the drum 109.

Coupled to the microprocessor 604 are memory units 608, 610 and 612. Memory unit 608 is an erasable programmable read-only memory ("EPROM") with a capacity of 16 K bytes. The EPROM 608 stores the operating program for the microprocessor 604. A programmable read-only memory is used to store these programs rather than RAM so that the operating programs will not be changed accidentally.

Static random access memory ("SRAM") 610 is also coupled to the microprocessor 604. The SRAM 610 stores various variables which microprocessor 604 requires for its operation. These include flags, counters and stack variable. SRAM 610 also acts as a buffer for holding inputted character information in the form of ASCII data.

Font/graphic cartridge 612 is a group of EPROM chips with either 640 K bytes or 1.2 M bytes of memory capacity. However, the common memory utilization procedure of mapping 2 pages of information over one another is utilized, providing an effective 1.2 M bytes of storage capacity. The cartridge 612 stores data defining the styles of characters to be printed, as well as graphic matter such as that needed to print the "worthy" name in the specific logo form shown in FIG. 3.

The memory 612 is called a "cartridge" because it can be replaced easily by removing it and plugging in other chips with different stored font and graphic information. The use of the cartridge is particularly advantageous in printing reservation confirmations in the airline business. Not only can a variety of fonts in different styles be shared, but a variety of logos and other information necessary to print attractive reservation confirmation coupons for a number of different business entities also can be shown.

Coupled to DRAM 620 is a multi-function memory access device ("MMAD") 616. The device 616 is constructed from a field-programmable logic array such as Signetics chip part no. PLS 105A. This is a bipolar state machine of the mealy type. The MMAD 616 is used to control both normal and burst-type accesses to the DRAM 620. Normal access occurs when no printing is being done and the image is being formed in the DRAM 620. Burst-type access is required for refreshing the DRAM during the printing process.

The MMAD 616 is also coupled to a Print Image Processor ("PIP") 618. The Print Image Processor 618 is also coupled to the DRAM 620. The Print Image Processor 618 converts the data read out of the DRAM 620 into signals needed to operate the firing circuits to energize the print head 89. PIP generates the correct addresses and row and column information for the proper activation of the various print engine ion generating sites, and also converts the information from the DRAM 620 into serial data for serially outputting the images. The PIP 618 is fabricated from numerous logic function chips such as counters, address generators and latches, as well as two additional PROM's. Creating PIP 618 from these logic chips allows images to be processed extremely quickly, much faster than would be possible if a microprocessor were used.

The output signals on output lines 619 include a head enable signal, a print head control signal, a clock signal, and serial data signals to the firing circuits.

The operating of the print engine control circuit is as follows:

Upon the completion of the loading of the input data in the DRAM pulses 607 are delivered from an optical shaft encoder 108 FIG. 5 attached to rotate with the drum 109 of the print engine 88. Due to speed variations in the motor, the positive pulses 609, 611, 613, etc. of wave form 607 vary in duration, as does the zero portion of the wave. The leading edge of each pulse is used to trigger a logic signal to the PIP 618, telling it to begin outputting data on lines 619. Each time PIP 618 has received this signal, it outputs 840 bits of information. This requires a fairly constant amount of time, approximately 110 microseconds. Waveform 601 shows the described PIP cycle, with constant widths B during the pulse, and varying widths C between pulses.

The time of each pulse in waveform 601 defines the time during which latent images of dots are formed across the width of the drum 109 in a certain narrow band. The next pulse defines an abutting band in which dots are formed, and so forth. The encoder 108 synchronizes the formation of each band of dots with the rotation of the drum to ensure excellent image fidelity. Other parts of the control circuit (not shown) are used to compare the speed of the drum 109 and the speed of the feed rollers 228 and 230 in the magnetic recording-/reproducing section 96 of the printer. Adjustments are made to delay or accelerate the start of image formation on the drum 109, thus ensuring that printing on each card will start at the same location.

On the leading edge 603 of each timing pulse, the Print Image Processor 618 takes on the status of bus master; that is, it controls the flow of data in the circuit. During the time that the Print Image Processor is bus master, it is enabled to read information from the DRAM 620, while, at the same time, preventing all other components from accessing the DRAM.

After PIP 618 has outputted 840 bits of data, it loses its status as bus master, and the microprocessor takes over as bus master. More specifically, the microprocessor 604 has direct memory access channels which now are free to communicate with the DRAM 620.

DRAM 620 requires frequent "refreshing" of its contents. This "refreshing" must occur at a minimum of every 4 milli-seconds. In other words, each of the 256 rows of the dynamic random access memory 620 must be accessed every 4 milli-seconds.

The microprocessor 604 is used, advantageously, to refresh DRAM 620 during the low portions C of the PIP 618 cycle. However, the time periods C of the PIP cycle often are not long enough to permit the DRAM to be completely refreshed. This problem is solved, advantageously, as follows.

When the next positive-going wave front 603 is received, the microprocessor 604 stores the identity of the memory location in DRAM 620 which it last refreshed. As soon as the PIP cycle goes low once again, the direct memory access channel again begins refreshing the DRAM memory at the next address after the address which the microprocessor stored at the end of the last PIP cycle.

The foregoing circuit and method are highly advantageous in that it uses the speed of discrete hardware components in DRAM 620 and Print Image Processor 618 while using the slower microprocessor 604 for refreshing the DRAM, and for controlling two-way data flow over the conductors in the circuit. There is sufficient time for the micro-processor, despite its much slower operating speed, to process an "interrupt service" routine during the periods B when the PIP 618 is bus master. This "interrupt service" routine is what enables the processor to store the location in the dynamic random access memory which was last refreshed and to resume its refreshing at an address immediately past that address when refresh can again occur.

When the PIP cycle once again goes low and allows the refresh cycle to begin, no processor commands are needed. The direct memory access channel has been primed by the processor 604 with the location of information where it will once again begin refreshing the dynamic random access memory during the next timing cycle.

Thus, the speed of operation is high, but the circuit complexity and cost are low.

PAGE STORAGE MEMORY

The mode used for printing the cards 50 and 66 (FIGS. 2 and 3) is very advantageous, but also creates some special problems. As it is apparent from FIGS. 2 and 3, each line of printed text matter extends longitudinally of the card and reads from left to right. Printing starts at the right hand portion of each card, so that each line is composed in a reverse direction. Moreover, the print head 89 FIG. 5B forms parts of several lines of characters simultaneously. For these and other reasons, the memory 620 in FIG. 19 must store a full page of information; that is, it must store enough information to print an entire card.

Several approaches have been used in the past to store information for forming images from plural spots or dots.

One approach is called "bit mapping", where each pixel for a given image is stored as one memory bit. This method has the advantage of providing extremely good control over the entire image on a pixel-by-pixel basis. However, a major drawback of this method is that it requires an exceedingly large memory. For example, the capacity of a bit-mapped memory would have to exceed two million bits to store the image required for each card in the present invention. In terms of cost, bulk and speed, this is unacceptable.

Another prior approach is "byte mapping". In byte mapping, the image is stored in a series of bytes wherein each byte represents eight bits of graphic information. The advantage of this approach is that it reduces the memory requirement to one eighth of the previous method. Not only does this reduce total cost, but it enables the printer to operate at a higher speed. The disadvantage is that the image can only be operated upon in a byte-by-byte fashion. In other words, eight bits of each image must be dealt with at a given moment. This causes particular problems at sharp boundaries between symbols or alphanumeric characters, or when one attempts to strike-over one character with another. In both these cases, byte mapping usually results in the loss of information around the borders of the characters and images, and results in poor character quality.

The present invention uses a scheme which is called "byte mapping/bit control". It combines the advantages of byte mapping, that is reduced memory requirements and higher operating speed, but also enables the user to carefully control a given image or graphic symbol, without losing any desired information, and thus does not degrade the image quality. An additional feature is that the invention can be realized with discrete logic circuit components, which are not only cheaper than microprocessors, but also operate at higher speeds.

FIG. 20 shows the structure of the DRAM memory 620 of FIG. 19. This structure shows the logic circuitry needed to perform the "byte mapping/bit control" operating method. Buffer 700 receives one byte of character information from a data bus "BDBUS". Depending on how the buffer has been configured at this moment, information may be written to the two arithmetic logic units 730 and 732. As each pulse from the timing circuit occurs, the information which was written to the ALUs will be moved from the ALUs to any one of the eight 256 K bit DRAM chips 710, 712, 714, 716, 718, 720, 722 and 724. New graphics or alphanumeric information enters at each timing pulse onto the buffer.

When data representing characters or images is stored in any one of the dynamic random access memories and information representing another character exists on the input lines to arithmetic logic units 732 or 730, and when both sets of data are to be written in the same location, a latch 740 configures arithmetic logic units 730 and 732 to perform any one of a set of logic functions upon the data which now exists. The ALUs are capable of performing any of the standard logic functions upon data placed on their input lines. These functions include "AND"ing data, "Or"ing data, or complementing data. When the images are suppose to overlap, with neither one obliterating the information stored in the other, the two ALU units would be configured as logic "OR" machines.

To give an example, a binary "one" usually represents the presence of information in a given byte. Thus, if two characters have the same information in a given location, "OR"ing the data would place a pixel of information in each location where it would be desired. If one of the characters had information and the other character did not, "OR"ing the data would still place the information there, thus avoiding the problem of losing information when one attempts strike overs. Also, in likewise fashion, if neither has information, the "OR"ing operation does not put information there. As each of these operations occurs upon a single memory access cycle, and since the machine has a clock pulse of 15 MHz, it is clear that this memory control and manipulation operates at extremely high speed. It is also clear from the foregoing description that no microprocessors are required to perform the memory manipulations. Not only does this result in an increase in speed, but it reduces the cost of the circuitry.

The size of the memory and, hence, its cost, has been greatly reduced from the size it would be if bit mapping were used. The space required in the printed circuit card stack 93 FIG. 5 is reduced, and manufacturing labor costs are reduced.

DOCUMENT INTERACTIVE RECORD (DIR)

As explained above, the information for related coupons is arranged in groups called "Document Interactive Records" or "DIRs".

There are two types of DIRs, a "print" DIR and a "diagnostic" DIR. A diagnostic DIR is generated by the host computer and commands the printer to perform certain diagnostic routines.

There are two kinds of "print" DIRs; one which represents a group of coupons for different parts or "legs" of the same trip for the same individual, and a second which represents group of coupons that are for different individuals but are related because they all have the same destination and similar information.

FIG. 21 shows the arrangement of information in a print DIR 1110. The DIR information packet 1110 includes coupon information packets B, C and D. The print DIR is distinguishable from a diagnostic DIR by the second character of the DIR data string. The second character of a print DIR is an "A". In contrast, the second character of a diagnostic DIR is a "B". All DIRs begin with the character "$" (a dollar sign) and end with two characters "]]" (double brackets).

RING BUFFER

In addition to the above described devices, a ring buffer 1120 (FIG. 23) is used to prevent information loss. The ring buffer 1120 is a 24 K byte memory area that is located in the independently powered RAM memory 1310 which is part of the system processor shown in FIG. 22.

The ring buffer 1120 (FIG. 23) is divided into three areas. One area is reserved for the storage of the DIR information packets 1110 during normal processing conditions. The size of this first area is 20 K bytes. A second area called an "overflow" area, which is utilized when there have been no interruptions to the printer operation, but the rate of information received from the host computer exceeds the printer's capacity to print coupons. To prevent information loss, the overflow ring buffer area stores the DIR information packets that cannot be placed in the first area. The size of the overflow ring buffer area is 3 K bytes. Lastly, the ring buffer contains a third reserved area. The third buffer area is a reserve area which is utilized following a printer interruption. The size of the third buffer is 1 K bytes.

COMMUNICATION LINK

As shown in FIG. 22, a Terminal Processor Unit (TPU) 1104 is located in the path of information flow between each printer and the central or host computer 82. The information path is the communication link 80. The TPU contains a switch 1106 that allows the printer to enable or disable the communication link 80. If the communication link 80 is disabled by the TPU, no information is exchanged between the printer 40 and the Host Computer 82. The switch 1106 is controlled by the processor's software.

SYSTEM PROCESSOR HARDWARE

The system processor 1300 shown in FIG. 22 includes a central processing unit (CPU) 1308, a reset circuit 1304, and a 16 MHZ clock 1302.

A Static RAM 1310 stores information including the DIR information packets 1110. A real time clock 1314 indicates the date, hour, minutes, and seconds. A battery 1312 acts as an independent supply of power to the real time clock 1314 and the static RAM 1310.

The host computer 82 sends data over the communications link 80 through the TPU 1104 through drivers and receivers 1306 and a serial communication link unit 1332. A baud clock 1334 sends timing pulses to the serial communication device 1332.

A reset switch 1335 is provided to initiate a power-up sequence, illustrated in FIG. 27, to re-start the printer after an interruption in its operation. A Liquid Crystal Display (LCD) 1336 gives a lighted display of printer functions. A plurality of parallel ports 1338 provide interfaces between the CPU and the various input/out devices.

The printer control circuit 601 of FIG. 19 is shown in the lower left portion of FIG. 22. A magnetic read/write device 1340 magnetically records data on the coupons and reads the magnetic recording from the coupons. A baud clock 1342 sends timing pulses to the read/write device 1340. A Dynamic Random Access Memory (DRAM) 1302 is temporary memory storage for the system processor's variables and data. A DRAM controller 1301 controls the DRAM 1302.

An erasable programmable read only memory (EPROM) 1306 stores the system processor's software. A document format cartridge 1314 is easily replacable memory storage for the formats used in printing documents. A counter timer 1316 controls the input keyboard 1318, document sensors 1320, and the tone output device 1322. A baud clock 1324 sends timing pulses to the counter timer 1316. The keyboard 1318 is one of those shown in FIG. 1 which is used by the operator to input data for printing. The sensors 1320 detect the movement of coupons from the coupon bin 102 and 103 to the print drum 109. The tone output device 1322 emits an audio tone to alert the operator to certain printer conditions. Generally, the tone is emitted following an error condition. A status panel 1326 shows the status of various printer functions. A motor and solenoid control circuit 1330 controls the various motors, which are located throughout the printer.

SOFTWARE

Computer Variables

Computer variables are used in a computer program to represent the status of hardware. Variables are used in computer programs to represent the results of computer calculations or the results of other computer operations. The variable is referred to in the computer by a name. The name represents an address in the memory. At the actual address is marked the calculation, status, or result.

TASKING

For efficient use of the processor, the CPU continuously assigns computer programs to perform specific objectives or "tasks". The computer program accomplishes these objectives by executing computer instructions. In some instances, the computer program can not continue until the occurrence of a particular event. For example, if a computer program requires an examination and transfer of a particular segment of information found in memory, the computer program cannot continue and must wait until the transfer of such information. To avoid wasting time and thus increase CPU efficiency, the CPU 1308 recognizes that the first program is in the waiting mode and allows a second computer program to execute instructions in the meantime. If the second computer program is in a waiting mode, the CPU repeats the process and finds a third program to operate, etc. Thus, if one computer program is waiting to perform its task, the CPU chooses one of several other computer programs which is presently able to execute instructions.

The task chosen by the computer is determined by a priority list. For example, if the communication task and the application task are waiting for the completion of an separate event (i.e. as described above), the priority list contains sufficient information to select a particular task.

The different tasks executed by the CPU are described in the processor as follows:

The feed task causes a coupon from one of the stacks (102 or 103 FIG. 5A) to be sent to the print drum 109.

The application task converts a DIR information packet in the ring buffer into signals representing a group of characters or an image corresponding to the printing on an actual coupon.

The system print task prevents the feed task from sending a second coupon to the print drum 109 before the first coupon has reached the print drum 109. The system print task creates a complete DIR information packet 1110 following a printer interruption.

In addition to the foregoing, there is a diagnostic task, a keyboard task, and a monitor task. These are known tasks which are not directly related to the present invention, and will not be described in detail.

RING BUFFER

FIG. 23 shows the ring buffer 1120 containing information corresponding to two multiple-coupon DIRs like the DIR 1100 shown in FIG. 21. Each of the separate storage locations in the ring buffer is indicated by a number from 0 to 92, each being located above the corresponding memory location. One DIR occupies locations 0-81, and another occupies locations 82-92.

The buffer 1120 is a first-in-first-out ("FIFO") memory in which data is read out of the storage locations in the same order in which data is entered. For example, data is read into location "0" first; location "1" second, etc. The first DIR is thus loaded into locations 0-81; followed by data of the second DIR.

When the ring buffer is full, the loading process continues with location "0", erasing all data previously stored there. In this manner, the sequential storage of DIRs proceeds as if data were being stored in a "ring"-shaped storage medium; hence, the "ring buffer" name.

It should be understood that the ring buffer actually has many more memory locations than those shown in FIG. 23; only a few locations are shown for the purposes of illustration.

The computer programming determines the location of the ring buffer in the RAM 1310 (FIG. 22).

The computer programming maintains two pointers that aid in placing and removing DIR packets 1110 from the ring buffer. These are the CURR APP variable 1122 (a "remove" pointer) and the DBUF NEXT variable 1126 (an "add" pointer). The add pointer 1126 aids in the placement of the DIR information packets 1110 into the ring buffer. A remove pointer aids in the removal of the DIR information from the ring buffer. The add and remove pointers are computer variables, which are located in the battery-backed static RAM memory 1310. The pointers are marked with a memory location in the ring buffer 1120. In FIG. 23, the CURR APP 1122 variable is marked with the address of the next location to remove from the DIR information packet 1110. The DBUF NEXT 1126 variable is marked with the address of the next location to place the DIR information packets 1110 in the ring buffer.

Generally, each DIR information packet 1110 is placed in the buffer next to the previous packet 1110. Similarly, the coupon information packets 1112 within each DIR are placed in adjacent locations. Consequently, each pointer is marked with the address of the next adjacent location.

When either the add pointer 1126 or the remove pointer 1122 is marked with the address of the highest location number in the memory; the next location is shifted back to the start of the buffer.

The communication task, which sends information from the host computer into the buffer 1120, marks the DBUFF NEXT 1126 variable as an add pointer. The application task that forms coupon images marks the CURR APP 1122 variable as a remove pointer. These tasks perform their respective functions simultaneously and independently. However, each task is subject to constraints.

If the application task has removed all of the DIR information packets sent by the host computer 80, the application task stops removing them. This condition occurs when the address marked in the CURR APP variable 1122 equals the address marked in the DUFF NEXT variable 1126.

A second constraint does not permit adding DIR packets when there is insufficient space in the ring buffer. The ring buffer contains insufficient space when the DUFF NEXT variable 1126 reaches the same address as the CURR APP variable 1122. The procedures used when this happens will be described below.

Start of Record

FIG. 24 illustrates the steps performed by the system software during the application task; that is, during reading of data out of the ring buffer.

The application task performs the step 802 of locating the next coupon information packet 1112 in the ring buffer (FIG. 23). The address of the coupon information packet 1112 is marked in the CURR app 1122 variable. The address is examined in step 804 to determine whether the information is the "$A" symbol indicating the beginning of the DIR, or a "]]" indicating the end of a DIR.

If either end symbol is found, the application task is suspended and the System task is invoked in step 826. Next, the address is examined in step 828. If the character is "$A", a computer variable named "application is inside a record" is marked at 830; that is, a flag is set to indicate the condition. In steps 832 and 834, the address is marked in the "start of record" variable; that is, the address is stored in the battery-backed RAM 1310, and the "TICKET COUNT" variable is marked set at zero. The system task or routine is suspended and the application task is resumed in step 836.

Alternatively, if the symbol is not a start symbol "$A", the "application is inside a record" flag is reset at 838 to show that printing of the DIR has been completed. The system task is suspended and the application task is invoked at 836.

If neither a start or end symbol is detected at 804, the coupon information is converted at 806 to a form suitable for printing a coupon. In step 808, the application task is suspended and the system print task is to print the coupon. In step 810, the system print task determines whether a card is feeding from one of the bins 102 or 103 to the print drum 109. The card feeding condition is sensed rapidly and repeatedly. If a card is feeding, a "wait" step 811 is invoked repeatedly until the coupon feed is complete.

When the coupon feed is complete, in step 812, the system print task sends the coupon image to the Print Engine Control Board (PECB FIG. 19). The PECB forms the pixel image of the coupon 66 (FIG. 3) to be printed. In step 814, the system print task waits until the PECB has completed its objective. During the wait 814, the application task is resumed in step 816. The application task repeats step 802 to locate the next information packet in the DIR.

After the PECB operation is complete, in step 818, the system print task is suspended and the feed task is invoked to move a coupon from bin 102 or 103 to the print drum 109. Following the completion of the feed task, the feed task is suspended and the system task is invoked in step 820. The feed task marks the "feed successful" variable to show if the coupon feed was successful (i.e. the coupon 66 did reach the drum 109.) The "feed successful" variable is examined at 821. If the computer variable indicates the feed task's objective was unsuccessful, a critical error event has occurred. If the critical error event has occurred, the End of Record search routines of FIG. 25 are executed.

If a critical error event has not occurred, the "ticket count" is increased by one so that the ticket count correctly indicates the number of coupons actually printed for the DIR being printed. The "card feeding" indicator is reset at 824 to indicate to the card feed detector at 810 that card feeding is complete.

End of Record Search

Figure 25:
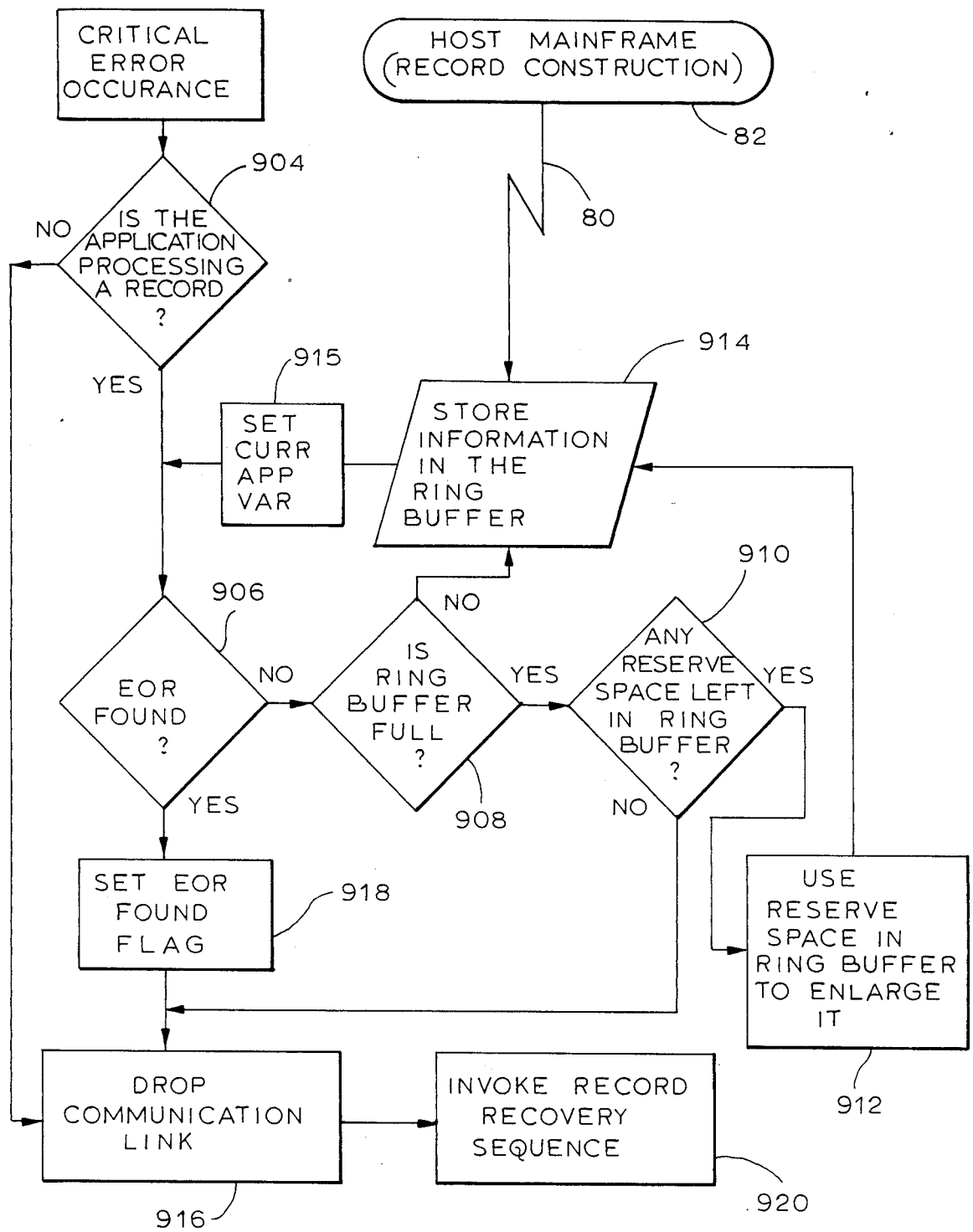

The End of Record Search is shown in FIG. 25. After a printer interruption and Critical Error Event, or if the basic 20 K byte storage area of the buffer is full, the routine shown in FIG. 25 operates to search for the end of the DIR then being transferred from the host computer to the ring buffer, and hold the communication link 80 open until the DIR has been completely received and stored, or until the ring buffer and its reserve storage area both are full, at which time the communication link is dropped by opening the switch 1106 in the TPU1104 (FIG. 22). The switch 1106 is not closed again until the malfunction (e.g., card jam) is corrected and the reset button is pushed, or, in the case where the buffer has been filled, the printer has emptied some space in the buffer.

The first step, upon a detection of the critical error occurrence, is to determine, at 904, whether a DIR is in the process of being stored in the ring buffer. This is done by use of a routine (not shown) like that in the lower left portion of FIG. 24 which determines whether an "application is inside a record" flag is "set" or "reset".

If neither the start nor end of a DIR is detected, step 916 is taken to open or drop the communication link 80 to prevent the transmission of further DIRs until the fault is corrected. However, if the DIR in process is not yet complete, the host computer 80 continues to send data until the DIR is complete or until the buffer's extra storage area is filled.

Since the printer is not operating and thereby erasing DIRs from the buffer, the buffer easily can be filled while trying to complete the transmission of the DIR in process. Therefore, a routine 908 s performed to measure whether the ring buffer is full, while a routine 906 signals when the end of record "]]" has been detected. If the buffer fills up before the end of the DIR is detected, and if any reserve space is detected at 910, then the reserve space will be added at 912 to the buffer. If the end of record is found before the reserve space is exhausted, a "EOR found" flag is set at 918, showing that the ring buffer 1120 contains a complete DIR, and the communication link is disabled 916. If the reserve space is exhausted before the end of record is detected, this is detected in step 910, and the communication link 80 is dropped to prevent further loss of data.

When the reserve space is being used, the CURR APP variable 1122 is marked in step 915 to show the new address. The CURR APP variable 1122 is examined at 906 as above.

The DBUF NEXT variable 1126 also is marked in step 912 to an appropriate address in the reserve.

Thus, except in the case of very long DIRs, the End of Record Search of FIG. 25 prevents the loss of data from DIRs by continuing to store the DIRs until fully stored in memory before dropping the communication link. As noted above, this same procedure is used to prevent the loss of data when the ring buffer fills because the printer cannot keep up with the incoming data.

After the communication link is dropped, the record recovery logic is executed in step 920.

Record Recovery Logic

As it has been explained above, the ring buffer in which incoming DIRs are stored is formed in battery-backed RAM 1310 (FIG. 22). When certain printer malfunctions occur, such as a card feeding jam, the jam usually can be corrected easily by the operator.

Referring to FIGS. 5 and 7 of the drawings of the printer, the operator simply lifts the hinged card transfer drive unit 98 upwardly to give ready access to the card storage bins and feeding mechanisms to facilitate correcting the problem.

However, for safety's sake, all high voltage power to the control system automatically is cut off when the drive unit 98 is raised. To restore power after correction of the trouble, a reset button 1335 (FIG. 22) must be pushed. This cuts all power to the DRAMs and control system in order to completely reinitialize it. Thus, but for the use of the battery - backed RAM 1310 (FIG. 22) to store the DIRs, they would be lost.

When power is restored after the coupon or card jam has been corrected, it is desired to resume printing at the point in the current DIR at which printing was halted when the power outage occurred, and to complete the job without repeating any printing already done.

The first thing to be done, however, is to determine whether all of the data in the DIR was saved during loss of power. It is possible, for example, that the DIR was so long that it exceeded the capacity of the ring buffer and all reserve space added to the buffer, or that data transmission was halted before storage of the DIR was complete. In either case, the DIR portion stored is incomplete so that the DIR cannot be recovered.

It is desired that the latter condition be indicated so that the operator will know that the DIR cannot be printed in full and that it must be transmitted again. The Record Recovery logic shown in FIG. 26 serves this purpose.

A stepping variable is initially marked at 950 to the beginning address of the interrupted DIR. This causes the entire DIR to be searched for an end of record symbol. The stepping variable is marked from the "Start of Record" variable which was previously stored in step 832 of FIG. 24.

In steps 952, 954 and 955, the data stored for the DIR is examined. If an end-of-record symbol "]]" is not found before the end of the buffer is reached, a flag is set in step 956 to indicate that the DIR cannot be recovered.

Figure 26:
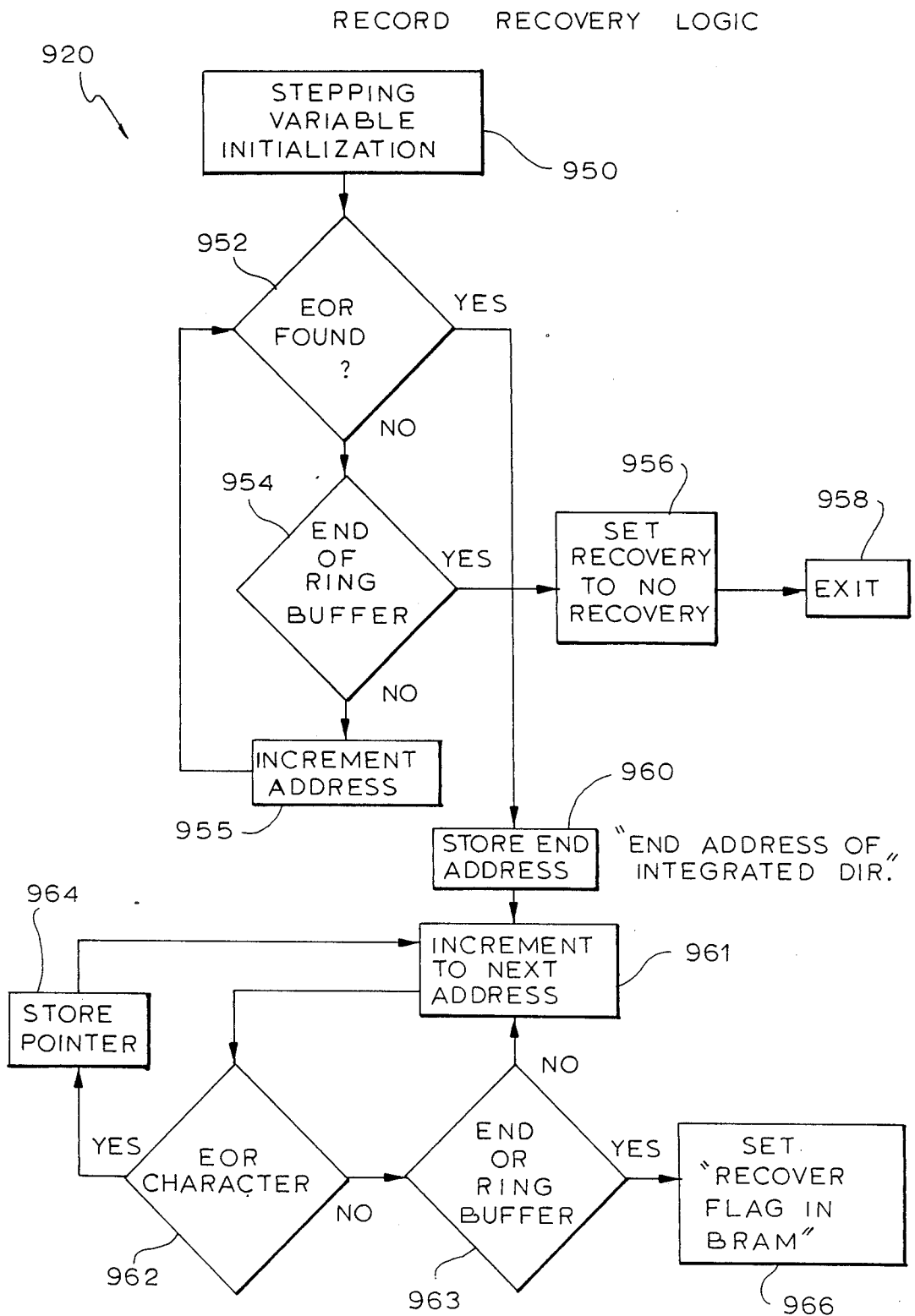
Figure 27A:
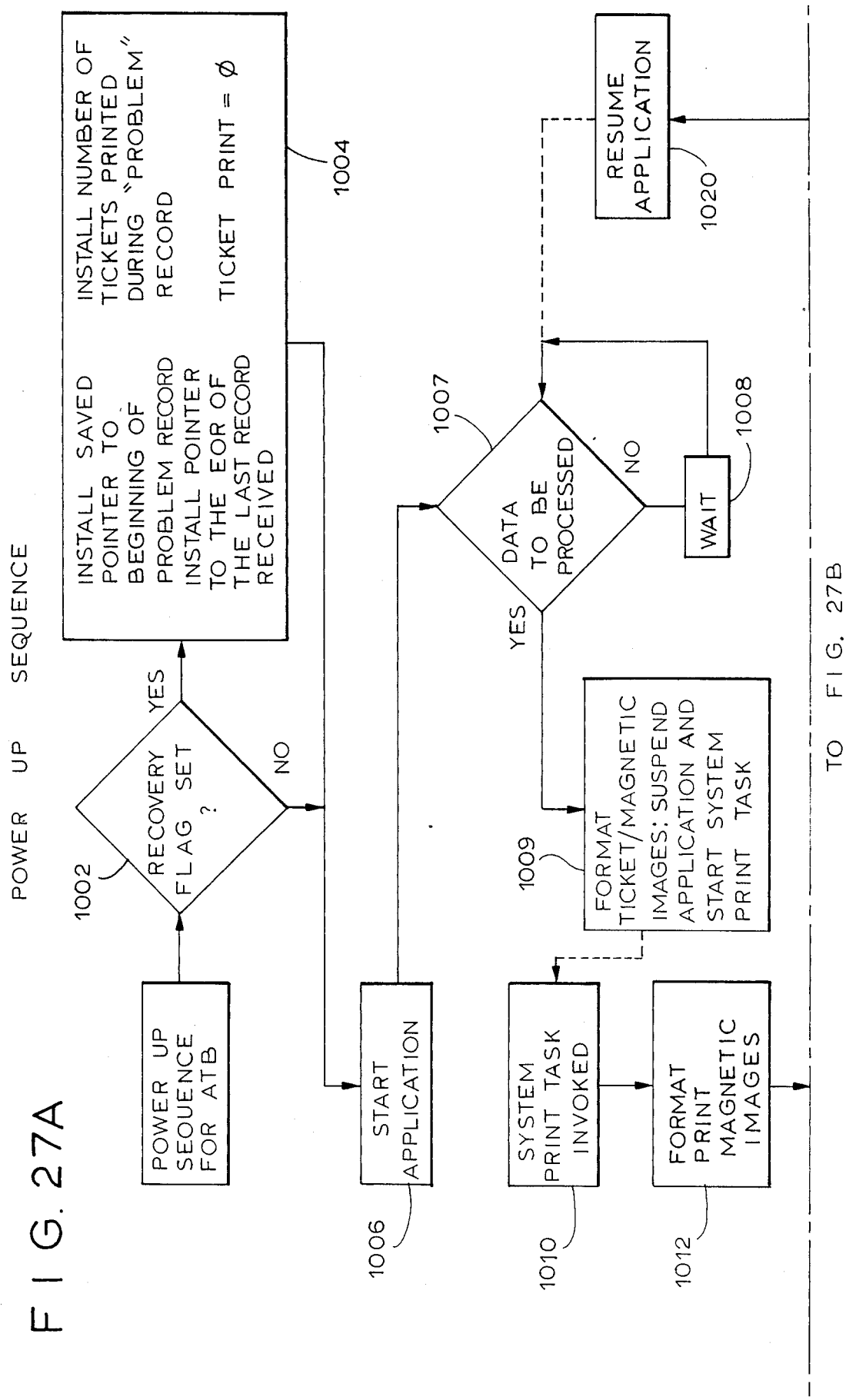

The steps in the lower part of FIG. 26 are those which are used to direct the location of new incoming DIRs when the printer is started again. The end of record location for the last DIR stored is located and a pointer is stored to indicate the location for storing the next DIR.

The stepping variable is marked at 961 to the next address in the ring buffer 1110. The address in the stepping variable is examined at 962 for the character "]]". If such character is found, the "last DIR" variable is marked 964 to the address in the stepping variable. The stepping variable is marked 961 to the next address in the ring buffer 1120.

If the character "]]" was not found as a result of the examination 962, the address of the stepping variable is compared in step 963 to the address found in the DBUFF NEXT variable 1122. If they are not equal, the stepping variable is marked in step 961 to the next address in the ring buffer 1120. If they are equal, the "Recover" variable is marked 956 to indicate loss of information can be prevented. The system task waits 958 for the reset operation.

Power up sequence

The system processor waits until the reset operation has occurred after the fault has been corrected. Following the reset operation, the power up sequence is initiated. This logic sequence is shown in FIG. 27.

First the "Recovery" flag is examined at 1002. If this flag is set, thus showing that the DIR can be recovered, several variables are marked in step 1004 as follows. The "CURR APP" variable 1122 is marked to the contents of the "start of the record" variable, which was saved in step 832 of FIG. 24. Thus, the read-out of information from the DIR returns to the start of the DIR.

The DBUF NEXT 1126 pointer is set to the address of the "last DIR" pointer which was stored at 964 in FIG. 26 so as to resume storing incoming DIRs at the right memory location.

The "tickets printed" variable is marked 1004 to 0. The "ticket count" variable is set to the number found in the "ticket count" variable which was set in step 822 of FIG. 24.

The system task is suspended and the application task is invoked in step 1006. The address marked in the CURR APP pointer 1122 is compared in step 1007 to the address in the DBUF NEXT pointer 1126. If the addresses of the two pointers are the same, the application task waits at 1008 for an address to change. If the addresses are different, the data for a coupon image is created in step 1009. The application task is suspended and the system print task is invoked 1010. Characters are added 1012 to the coupon image. The "recovery" flag condition is examined at 1014. If the flag was set to show that the loss of information cannot be prevented, the "card feeding" variable is examined at 1022, and printing of the next DIR is started.

If the "recovery" flag is set to show the loss of information can be prevented, the "ticket count" is compared in step 1016 with the "ticket printed" number. If the "ticket count" is algebraically greater than or equal to the "ticket printed" number, the contents of the "ticket kount" variable is decremented at 1018; the system print task is suspended and the application task is invoked in step 1020. The CURR APP pointer 1122 is compared 1007 to the DBUF NEXT pointer 1126, and the process is repeated.

Following the comparison 1016, when the "ticket count" is algebraically less than the "ticket printed" number, the "card feeding" variable is examined at 1022 to start the printing of the next ticket. If a card is feeding, the system print task waits at 1024 for the feed to be completed. When a coupon is not feeding, in step 1026, the system print task sends the coupon image to the PECB. The system task waits at 1028 until the PECB function is complete. The application program is resumed at 1030.

When the PECB has completed its function, the system print task is suspended and the feed task is invoked at 1032. The character in the "feed successful" variable is examined at 1036. If the "feed successful" variable is marked to indicate an unsuccessful feed, a critical error event has occurred. If the variable indicates a successful feed operation, the "tickets printed" variable is incremented at 1038.

The character in the "recovery" variable is examined at 1040. If the character in the "Recovery" variable is marked to show the loss of information cannot be prevented, the application task is resumed 1020. If the "recovery" variable is marked to show the loss of information can be prevented, the communication link is enabled at 1042 and the "recovery" variable is marked at 1042 to show the loss of information can be prevented. The system task is suspended and the application task is onvoked at 1020.

Operation of the power-up sequence can be summarized by way of the following example. If four tickets were printed in a DIR before the printer shut down occurred, the "ticket count" would be four, and the "tickets printed" would be zero at the start of the power-up sequence, after the step 1004 has been completed.

The first operation of step 1009 sets the format and other information necessary to print the first ticket in the DIR. This includes the information which is common to every ticket in the DIR; e.g., a common flight number, destination, etc., for a large travel group, or a single set of passenger identification data for a single passenger being ticketed for a trip having multiple legs.

The routine 1016 determines when the "ticket printed" number exceeds the "ticket count", thus indicating that the system is ready to print the next ticket after the last one which was printed before the printer shut down. This is done by decrementing the "ticket count" by one for each cycle of operation after the start of the power-up sequence. This repeats steps 1009, 1010 and 1012 for each ticket that was printed before so that all common information for those tickets has been obtained and can be used for printing the remaining tickets in the DIR.

Then, when the "ticket count" has been decremented to a value less than the "ticket printed" count, the actual printing of the remaining tickets in the DIR is started and continues until completed, or until another interruption in printer operation occurs.

In this manner, the common data in each DIR is utilized to complete the printing job, but without having to repeat the printing of the tickets already printed.

Common data is stored at the beginning of the DIR, but it also can be stored later in the DIR, when the common data is to be used for only a few of the tickets being printed. The recovery routine of this invention is advantageous in that it retrieves all such common data, wherever in the DIR it is located.

From the foregoing, it can be seen that the invention meets the objectives set forth above. The printer 44 is fast, compact, versatile, simple in construction, produces relatively high-quality printing, and yet is relatively low in cost.

The printer 44 will print successive cards in less than one second each. The cost of the "consumable" materials (toner) it uses is modest in comparison with ribbon costs for some prior printers.

A misfeed in the printer is simple to correct so that technically untrained ticket sellers will not lose valuable time in fixing misfeeds or jams.

The preferred embodiment of the invention uses an ion deposition type of printer. However, many features of the invention are useful with printers of other types too. Furthermore, it should be recognized that the printer can be used to great advantage in selling and dispensing railroad, bus and other tickets and coupons.

The printer handles the receipt and printing of data from a host computer in the form of "Document Interactive Records" with a minimum loss of data or printing time, and minimum memory requirements when the printer becomes inoperative.

The above description of the invention is intended to be illustrative and not limiting. Various changes or modifications in the embodiments described may occur to those skilled in the art and these can be made without departing from the spirit or scope of the invention.

I claim:

1. A printer for printing documents, said printer comprising, in combination:
    (a) image forming means for forming latent electrostatic images from image-defining electrical signals;
    (b) a drum for receiving and retaining said latent electrostatic images;
    (c) a rotary toner brush adjacent the drum for transferring toner material to the drum to develop the latent images;
    (d) first drive means for rotating the drum between a first position for receiving the electrostatic images and a second position for transferring the developed images onto the documents;
    (e) means for causing said first drive means to operate continuously during a period in which a group of documents is being printed;
    (f) means for feeding said documents to the second position;
    (g) second drive means for rotating the toner brush independently of said first drive means; and
    (h) means for causing said second drive means to operate intermittently during the period in which the group of documents is printed.

2. A printer as in claim 1 wherein the rotary toner brush produces a plurality of outwardly-extending lobes of toner material and further comprises magnetic means for rotating the lobes between a first position in which none of the lobes is sufficiently near the drum to apply toner thereto and a second position in which at least one lobe is sufficiently near the drum for the application of toner.

3. A printer as in claim 2 including means for energizing said second drive means when said lobes of toner material are at their second position, and for de-energizing said second drive means when the lobes are at their first position.

4. A printer as in claim 1 wherein the second drive means is operative when latent image-bearing areas of said drum move past said brush, and is inoperative when non-image-bearing areas move past.

5. A printer as in claim 1 wherein said second drive means is a relatively high-torque D.C. motor.

6. A printer for printing electrically stored information on documents, said printer comprising, in combination:
    (a) a drum for receiving and retaining latent electrostatic images;
    (b) a rotary toner brush adjacent the drum for selectively transferring toner material to the drum to develop the latent images;
    (c) means for continuously rotating the drum while printing a plurality of documents in a group;
    (d) means for feeding the documents to a position adjacent said drum for transfer of images from said drum to said documents; and
    (e) means for rotating said toner brush to replenish its toner content during the period that latent image-bearing areas of said drum move past said brush, but not at other times.

7. A printer as in claim 6 wherein the means for rotating said drum comprises a first motor and the means for rotating said toner brush comprises a second motor.

8. A printer as in claim 7 wherein said second motor is a relatively high-torque D.C. motor.

9. A printer as in claim 6 wherein the rotary toner brush produces a plurality of outwardly-extending lobes of toner material and further comprises magnetic means for rotating the lobes between a first position in which none of the lobes is sufficiently near the drum to apply toner thereto and a second position in which at least one lobe is sufficiently near the drum for the application of toner.

10. A printer as in claim 9 including means for shifting said lobes to said second position when said toner brush is rotating, and to said first position when said toner brush is not rotating.

11. A method for printing documents comprising the steps of:
    (a) receiving and retaining latent electrostatic images on a drum;
    (b) transferring toner material onto the drum from a rotary toner brush to develop the latent images;
    (c) rotating the drum continuously during a period that the plurality of documents are being printed in sequence;
    (d) transferring images from said drum to said documents; and
    (e) replenishing toner material onto said brush during the periods that latent image-bearing areas are moving past said brush and ceasing said replenishing at other times.

12. A method as in claim 11 including the step of withdrawing the operative toner transfer surface of said brush away from said drum to prevent it from transferring toner to said drum during said other times.

13. A method as in claim 12 in which said replenishing step comprises rotating a shell around a stationary magnet forming lobes of magnetic toner material on the outside of said shell, said shell moving past a toner dispensing station to pick up toner therefrom, and said withdrawing step comprises rotating said magnet to move said lobes away from said drum.

14. A method as in claim 11 in which said drum rotating and replenishing steps are performed by two independent drive sources.

15. A method for printing documents comprising the steps of:
    (a) receiving data in the form of a dot-matrix-forming signal and for forming and retaining on said drum latent electrostatic images forming characters
    (b) presenting toner material to the drum from a rotary toner brush to develop the latent images;
    (c) rotating the drum continuously, during a period that a plurality of documents are being printed, between a first position for receiving the electrostatic images and a second position for printing the developed images onto the documents;
    (d) feeding the documents to the second position;
    (e) rotating the surface of the toner brush intermittently during said period by means disassociated mechanically from those used to rotate the drum.

16. A method as in claim 15 in which said rotating steps are performed by independent D.C. drive motors and drive coupling means.

17. A printer for printing vehicular transportation documents, particularly airline coupons, said printer comprising, in combination:
    (a) a dielectric drum for receiving character-forming radiation from electrically-stored information, and retaining corresponding latent electrostatic images;
    (b) a rotary magnetic toner brush adjacent the drum for presenting toner material intermittently to the drum to effect the development of said latent images;
    (c) a hopper adjacent the toner brush for dispensing toner material to the toner brush;
    (d) first motor means for rotating the drum continuously, during a period that a plurality of documents are being printed, between a first position for receiving the electrostatic images and a second position for printing the developed images onto the documents;
    (e) means for feeding the documents to the second position with spaces between successive ones of said documents; and
    (f) second motor means for rotating the surface of the toner brush intermittently during said period such that the surface of the toner brush is rotated only during said development and not at other times.

18. A printer as in claim 17 wherein the second motor means is a D.C. motor.

* * * * *